(12) United States Patent
    Takahashi

(10) Patent No.: US 10,752,778 B2
(45) Date of Patent: Aug. 25, 2020

(54) RESIN COMPOSITION CONTAINING SURFACE-MODIFIED INORGANIC SUBSTANCE, THERMALLY CONDUCTIVE MATERIAL, AND DEVICE

(71) Applicant: FUJIFILM Corporation, Tokyo (JP)

(72) Inventor: Keita Takahashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 4 days.

(21) Appl. No.: 16/045,712

(22) Filed: Jul. 25, 2018

(65) Prior Publication Data

US 2018/0327602 A1    Nov. 15, 2018

Related U.S. Application Data

(63) Continuation of application No. PCT/JP2017/002468, filed on Jan. 25, 2017.

(30) Foreign Application Priority Data

Jan. 26, 2016  (JP) ................. 2016-012617

(51) Int. Cl.

| C08L 101/00 | (2006.01) |
|---|---|
| C08K 9/04 | (2006.01) |
| C08G 65/22 | (2006.01) |
| C01B 21/064 | (2006.01) |
| C01B 21/072 | (2006.01) |
| C08L 63/00 | (2006.01) |
| C08G 65/18 | (2006.01) |
| C01B 21/068 | (2006.01) |
| C09K 5/14 | (2006.01) |
| C08K 5/1515 | (2006.01) |
| C08K 5/55 | (2006.01) |
| C08K 3/28 | (2006.01) |
| C08J 5/18 | (2006.01) |
| C08K 3/22 | (2006.01) |
| C08K 5/14 | (2006.01) |
| C08K 3/38 | (2006.01) |

(52) U.S. Cl.
CPC .......... C08L 101/00 (2013.01); C01B 21/064 (2013.01); C01B 21/068 (2013.01); C01B 21/072 (2013.01); C08G 65/18 (2013.01); C08G 65/22 (2013.01); C08K 5/1515 (2013.01); C08K 5/55 (2013.01); C08K 9/04 (2013.01); C08L 63/00 (2013.01); C09K 5/14 (2013.01); C08J 5/18 (2013.01); C08K 3/22 (2013.01); C08K 3/28 (2013.01); C08K 3/38 (2013.01); C08K 5/14 (2013.01); C08K 2003/2227 (2013.01); C08K 2003/2237 (2013.01); C08K 2003/2241 (2013.01); C08K 2003/2296 (2013.01); C08K 2003/282 (2013.01); C08K 2201/001 (2013.01)

(58) Field of Classification Search
CPC ...... C08L 101/00; C08L 63/00; C01B 21/064; C01B 21/072; C01B 21/068; C08G 65/18; C08G 65/22; C08G 9/04; C08K 5/1515; C08K 5/55; C08K 9/04; C09K 5/14

See application file for complete search history.

(56) References Cited

U.S. PATENT DOCUMENTS

| 5,518,783 | A | 5/1996 | Kawata et al. |
|---|---|---|---|
| 6,136,225 | A | 10/2000 | Meyer et al. |
| 7,109,288 | B2 | 9/2006 | Akatsuka et al. |
| 7,445,797 | B2 | 11/2008 | Meneghetti et al. |
| 7,696,353 | B2 | 4/2010 | Takahashi et al. |
| 7,968,156 | B2 | 6/2011 | Tanaka et al. |
| 8,304,554 | B2 | 11/2012 | Takahashi et al. |
| 8,524,334 | B2 | 9/2013 | Hamasaki et al. |
| 8,981,108 | B2 | 3/2015 | Hamasaki et al. |
| 9,481,658 | B2 | 11/2016 | Hamasaki et al. |
| 2006/0276568 | A1 | 12/2006 | Akatsuka et al. |
| 2016/0049610 | A1 | 2/2016 | Harkema et al. |
| 2017/0247546 | A1* | 8/2017 | Takahashi ............ C01B 21/064 |

FOREIGN PATENT DOCUMENTS

| CN | 105210208 | 12/2015 |
|---|---|---|
| EP | 2684904 | 1/2014 |
| JP | H07281028 | 10/1995 |
| JP | H07306317 | 11/1995 |

(Continued)

OTHER PUBLICATIONS

Danu et al. UV-curing of titanium dioxide pigmented epoxy acrylate coating on ceramic tiles. Journal of the Ceramic Society of Japan (116[8] 896-903 2008) (Year: 2008).*

(Continued)

*Primary Examiner* — John E Uselding

(74) *Attorney, Agent, or Firm* — JCIPRNET

(57) ABSTRACT

According to the present invention, there are provided a resin composition containing a surface-modified inorganic substance, which is obtained by performing surface modification on an inorganic nitride or an inorganic oxide by using a boronic acid compound, and an epoxy compound, a thermally conductive material including a cured substance of the resin composition, and a device including the thermally conductive material. The boronic acid compound has, for example, an amino group, a thiol group, a hydroxyl group, an isocyanate group, a carboxyl group, or a carboxylic acid anhydride group. By using the resin composition of the present invention, it is possible to provide a thermally conductive material having excellent thermal conductivity and a device having high durability.

22 Claims, No Drawings

(56) References Cited

FOREIGN PATENT DOCUMENTS

| | | | | |
|---|---|---|---|---|
| JP | 2696480 | 1/1998 | | |
| JP | H11323162 | 11/1999 | | |
| JP | H11513019 | 11/1999 | | |
| JP | 2001192500 | 7/2001 | | |
| JP | 2001226458 | 8/2001 | | |
| JP | 2005156822 | 6/2005 | | |
| JP | 2006076992 | 3/2006 | | |
| JP | 2006257392 | 9/2006 | | |
| JP | 2006301614 | 11/2006 | | |
| JP | 2007002220 | 1/2007 | | |
| JP | 2008013759 | 1/2008 | | |
| JP | 4118691 | 7/2008 | | |
| JP | 2010174139 | 8/2010 | | |
| JP | 2010244038 | 10/2010 | | |
| JP | 4858470 | 1/2012 | | |
| JP | 2012067225 | 4/2012 | | |
| JP | 2013227451 | 11/2013 | | |
| JP | 5385937 | 1/2014 | | |
| JP | 5620129 | 11/2014 | | |
| JP | 2015040278 | 3/2015 | | |
| JP | 2015052710 | 3/2015 | | |
| JP | 2015145447 | 8/2015 | | |
| JP | 2016000801 | 1/2016 | | |
| JP | 2016066041 | 4/2016 | | |
| KR | 20150135436 | 12/2015 | | |
| WO | 9700600 | 1/1997 | | |
| WO | WO-2014158018 A1 * | 10/2014 | ......... | H01L 51/5268 |
| WO | 2016084873 | 6/2016 | | |

OTHER PUBLICATIONS

Terutsune Osawa et al.,"Wide-Range 2D Lattice Correlation Unveiled for Columnarly Assembled Triphenylene Hexacarboxylic Esters", Angewandte Communications, vol. 51, Issue32, Aug. 6, 2012,pp. 7990-7993.

Maruzen Co., Ltd.,"Liquid Crystal Handbook",the manual of Liquid Crystal Handbook, with brief English explanation, publish on Oct. 30, 2000,pp. 330-333.

Yoshitaka Takezawa, "Highly Thermally Conductive Composite Material",CMC Publishing Co.,Ltd., with brief English explanation, Jan. 26, 2011, pp. 63-78.

"International Search Report (Form PCT/ISA/210) of PCT/JP2017/002468" , dated Mar. 28, 2017, with English translation thereof, pp. 1-5.

"International Preliminary Report on Patentability (Form PCT/IPEA/409) of PCT/JP2017/002468", dated Jan. 19 2018, with English translation thereof, pp. 1-14.

Office Action of Korea Counterpart Application, with English translation thereof, dated Feb. 20, 2020, pp. 1-10.

"Office Action of China Counterpart Application," with English translation thereof, dated Dec. 6, 2019, p. 1-p. 12.

K.I. Lukashev et al., "Supergene Zone Geochemistry", Scientific and Technical Documentation Press, Jun. 1992, pp. 1-6.

Sugiarto Danu, et al., "UV-curing of titanium dioxide pigmented epoxy acrylate coating on ceramic tiles." Journal of the Ceramic Society of Japan. vol. 116, No. 8, Dec. 31, 2008, pp. 896-903.

"Office Action of China Counterpart Application", dated May 21, 2020, with English translation thereof, pp. 1-14.

* cited by examiner

RESIN COMPOSITION CONTAINING SURFACE-MODIFIED INORGANIC SUBSTANCE, THERMALLY CONDUCTIVE MATERIAL, AND DEVICE

CROSS-REFERENCE TO RELATED APPLICATIONS

This application is a continuation of PCT International Application No. PCT/JP2017/002468 filed on Jan. 25, 2017, which claims priority under 35 U.S.C. § 119 (a) to Japanese Patent Application No. 2016-012617 filed on Jan. 26, 2016, the entire contents of which are incorporated herein by reference.

BACKGROUND OF THE INVENTION

1. Field of the Invention

The present invention relates to a resin composition containing a surface-modified inorganic substance. Furthermore, the present invention relates to a thermally conductive material containing a cured substance of the resin composition and a device including the thermally conductive material.

2. Description of the Related Art

A surface-modified inorganic substance obtained by modifying the surface of an inorganic substance such as an inorganic oxide or an inorganic nitride is used in various fields as a pigment, a catalyst, an electrode material, a semiconductor material, a heat dissipation material, a thermally conductive material, a lubricant, and the like.

Regarding the compounds used for surface modification of an inorganic oxide, the surface modification based on the formation of a chemical bond by a carboxylic acid such as a long-chain alkyl fatty acid and an acid such as organic phosphonic acid or an organic phosphoric acid ester through an acid-base reaction or the surface modification based on the formation of a chemical bond with an organic silane molecule through a silane coupling reaction is known.

As a method for modifying the surface of an inorganic nitride, JP2006-257392A discloses a method in which silane, aluminate, or a titanate coupling agent is caused to react with the surface of an inorganic nitride particle such that the surface of the inorganic nitride particle is modified. Furthermore, JP2001-192500A reports a method of mixing boron nitride with 1,4-phenylene diisocyanate and heating the mixture in a solvent under reflux. In addition, JP4858470B describes a method of using a compound, which has two reaction points including an anhydride portion and an acid chloride portion, and an aromatic diamino compound.

In recent years, a number of thermally conductive materials have been developed which are obtained by performing curing or the like on a resin composition prepared by mixing a surface-modified inorganic substance with a resin binder. According to recent reports, as the resin binder, in addition to a general epoxy compound which has been used in the related art, a liquid crystal compound is used in some cases (JP1999-323162A (JP-H11-323162A and JP4118691B).

SUMMARY OF THE INVENTION

By the surface modification, the affinity or reactivity between an inorganic substance and a resin binder contained in the aforementioned resin composition is also improved. In a case where a compound, which has the characteristics for modifying the surface of an inorganic substance and exhibits excellent reactivity with respect to a resin binder, is selected as a compound for modifying the surface of an inorganic substance, a resin composition is likely to be obtained which makes it possible to obtain a thermally conductive material having thermal conductivity higher than that of the resin compositions known in the related art.

An object of the present invention is to provide a resin composition which makes it possible to obtain a thermally conductive material having excellent thermal conductivity. Another object of the present invention is to provide a thermally conductive material having excellent thermal conductivity and a device having high durability.

In order to achieve the aforementioned objects, the inventor of the present invention attempted to modify the surface of an inorganic substance by using various compounds. As a result, the inventor obtained knowledge that in a case where a boronic acid compound is used, the surface of an inorganic substance can be much more easily modified than in a case where the methods disclosed in JP2006-257392A, JP2001-192500A, and JP4858470B are used. Furthermore, the inventor obtained knowledge that a cured substance, which is prepared by mixing a surface-modified inorganic substance obtained as above with various highly versatile epoxy compounds as a resin binder, has high thermal conductivity. Based on the knowledge, the inventor of the present invention repeated examinations and has accomplished the present invention.

That is, the present invention provides [1] to [18] described below.

[1] A resin composition comprising a surface-modified inorganic substance which is obtained by performing surface modification on one or more inorganic substances selected from the group consisting of an inorganic nitride and an inorganic oxide by using a boronic acid compound, and an epoxy compound.

[2] The resin composition described in [1], in which the surface modification is modification based on the formation of a covalent bond that the boronic acid compound forms with a surface of the inorganic substance.

[3] A resin composition comprising one or more inorganic substances selected from the group consisting of an inorganic nitride and an inorganic oxide, a boronic acid compound, and an epoxy compound.

[4] The resin composition described in any one of [1] to [3], in which the inorganic substance is an inorganic nitride.

[5] The resin composition described in [4], in which the inorganic nitride includes boron, aluminum, or silicon.

[6] The resin composition described in [4], in which the inorganic nitride is boron nitride.

[7] The resin composition described in [4], in which the inorganic nitride is aluminum nitride.

[8] The resin composition described in any one of [1] to [3], in which the inorganic substance is an inorganic oxide.

[9] The resin composition described in [8], in which the inorganic oxide is titanium oxide, aluminum oxide, or zinc oxide.

[10] The resin composition described in any one of [1] to [9], in which the boronic acid compound is represented by General Formula I.

General Formula I

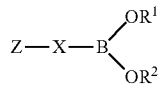

In the formula, Z represents an amino group, a thiol group, a hydroxyl group, an isocyanate group, a carboxyl group, a carboxylic acid anhydride group, a polymerizable group, a hydrogen atom, a halogen atom, a quaternary ammonium group or a salt thereof, or a quaternary pyridinium group, which may have a substituent, or a salt thereof, X represents a divalent linking group including at least one linking group A selected from the group consisting of a divalent aliphatic hydrocarbon group which may have a substituent, an arylene group which may have a substituent, and a heteroarylene group which may have a substituent, $R^1$ and $R^2$ each independently represent a hydrogen atom, an aliphatic hydrocarbon group which may have a substituent, an aryl group which may have a substituent, or a heteroaryl group which may have a substituent, and $R^1$ and $R^2$ may be linked to each other through an alkylene linking group, an arylene linking group, or a linking group formed of a combination of these.

[11] The resin composition described in any one of [1] to [9], in which the boronic acid compound is represented by General Formula II;

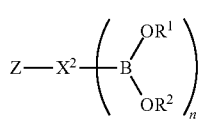

General Formula II

In the formula, Z represents an amino group, a thiol group, a hydroxyl group, an isocyanate group, a carboxyl group, a carboxylic acid anhydride group, a polymerizable group, a hydrogen atom, a halogen atom, a quaternary ammonium group or a salt thereof, or a quaternary pyridinium group which may have a substituent or a salt thereof, $X^2$ represents an (n+1)-valent linking group including at least one linking group A selected from the group consisting of a divalent aliphatic hydrocarbon group which may have a substituent, an arylene group which may have a substituent, and a heteroarylene group which may have a substituent, $R^1$ and $R^2$ each independently represent a hydrogen atom, an aliphatic hydrocarbon group which may have a substituent, an aryl group which may have a substituent, or a heteroaryl group which may have a substituent, $R^1$ and $R^2$ may be linked to each other through an alkylene linking group, an arylene linking group, or a linking group formed of a combination of these, and n represents an integer of equal to or greater than 2.

[12] The resin composition described in any one of [1] to [11], in which the boronic acid compound has an amino group, a thiol group, a hydroxyl group, an isocyanate group, a carboxyl group, or a carboxylic acid anhydride group.

[13] The resin composition described in any one of [1] to [12], further comprising a curing agent having a group selected from the group consisting of an amino group, a thiol group, a hydroxyl group, an isocyanate group, a carboxyl group, and a carboxylic acid anhydride group.

[14] The resin composition described in [13], in which the boronic acid compound has an oxiranyl group.

[15] A thermally conductive material comprising a cured substance of the resin composition described in any one of [1] to [14].

[16] The thermally conductive material described in [15] that is in the form of a sheet. [17] The thermally conductive material described in [16] that is a heat dissipation sheet.

[18] A device comprising the thermally conductive material described in any one of [15] to [17].

According to the present invention, there is provided a resin composition which makes it possible to obtain a thermally conductive material having excellent thermal conductivity. By using the resin composition of the present invention, it is possible to provide a thermally conductive material having excellent thermal conductivity and a device having high durability.

DESCRIPTION OF THE PREFERRED EMBODIMENTS

Hereinafter, the present invention will be specifically described.

In the present specification, "to" means that the numerical values listed before and after "to" are of a lower limit and an upper limit, respectively. In the present specification, the description of "(meth)acryl group" means "either or both of an acryl group and a methacryl group". The same is true for the description of "(meth)acrylate" or the like.

In the present specification, "surface-modified" means a state where an organic substance is adsorbed onto at least a portion of the surface of an inorganic substance. The way the organic substance is adsorbed is not particularly limited, and the organic substance may be in a bonded state. That is, "surface-modified" includes a state where an organic group obtained by the dissociation of a portion of an organic substance forms a bond with the surface of an inorganic substance. The bond may be any one of a covalent bond, a coordinate bond, an ionic bond, a hydrogen bond, a van der Waals bond, and a metallic bond, but is preferably a covalent bond. In the "surface-modified" state, a monolayer may be formed on at least a portion of the surface. The monolayer is a monolayer film formed by the chemical adsorption of organic molecules, and is known as Self-Assembled Monolayer (SAM). The organic substance is a so-called organic compound, and means a carbon atom-containing compound excluding carbon monoxide, carbon dioxide, carbonate, and the like that are customarily classified as an inorganic compound. In the present specification, the "surface-modified" state may be established on only a portion of the surface of an inorganic substance or on the entirety of the surface of an inorganic substance.

In the present specification, "surface-modified inorganic substance" means an inorganic substance whose surface is modified, that is, a substance in which an organic substance is adsorbed onto the surface of an inorganic substance.

<Resin Composition>

The resin composition of the present invention contains a surface-modified inorganic substance and an epoxy compound.

The resin composition may contain one kind of surface-modified inorganic substance or two or more kinds of surface-modified inorganic substances. Furthermore, the resin composition may contain one kind of epoxy compound or two or more kinds of epoxy compounds.

The resin composition may contain, in addition to the surface-modified inorganic substance and the epoxy compound, a curing agent, another main agent (an acryl resin monomer or the like), a curing accelerator, and the like. In the present specification, the curing agent means a compound having a functional group selected from a hydroxyl group, an amino group, a thiol group, an isocyanate group, a carboxyl group, and a carboxylic acid anhydride group, and the main agent means a compound having a functional group selected from the group consisting of a (meth)acryl group, an oxiranyl group, and an oxetanyl group.

The resin composition may contain only a main agent or contain a main agent and a curing agent.

<Surface-Modified Inorganic Substance>

In the surface-modified inorganic substance contained in the resin composition of the present invention, a boronic acid compound modifies the surface of an inorganic substance which is an inorganic nitride or an inorganic oxide. It is preferable that the boronic acid compound performs surface modification by conducting a chemical reaction with the inorganic substance. Typically, the boronic acid compound may react with a —NH$_2$ group or a —OH group on the surface of an inorganic substance and form a bond represented by —NH—B— or a bond represented by —O—B—. For example, in a case where the compound represented by General Formula I which will be described later is used as the boronic acid compound, organic chains represented by Z—X— can exist on the surface of the inorganic substance through the aforementioned bond. The organic chains may then form a monolayer preferably in an arrayed state.

The shape of the surface-modified inorganic substance is not particularly limited, and may be granular, film-like, or plate-like. The granular surface-modified inorganic substance may be made into finer granules by using a treatment such as dispersion. Furthermore, the surface-modified inorganic substance may have the shape of a nanosheet, a nanotube, a nanorod, or the like.

[Inorganic Substance]

As the inorganic substance in the surface-modified inorganic substance of the present invention, an inorganic oxide or an inorganic nitride is used. The inorganic substance may be an inorganic oxynitride. It is preferable that the inorganic substance in the surface-modified inorganic substance of the present invention is an inorganic nitride. The shape of the inorganic substance is not particularly limited, and may be granular, film-like, or plate-like.

The granules may have a rice grain shape, a spherical shape, a cubical shape, a spindle shape, a scale shape, an aggregated shape, or an amorphous shape.

The inorganic oxide is not particularly limited, and examples thereof include zirconium oxide ($ZrO_2$), titanium oxide ($TiO_2$), silicon oxide ($SiO_2$), aluminum oxide ($Al_2O_3$), iron oxide ($Fe_2O_3$, FeO, or $Fe_3O_4$), copper oxide (CuO or $Cu_2O$), zinc oxide (ZnO), yttrium oxide ($Y_2O_3$), niobium oxide ($Nb_2O_5$), molybdenum oxide ($MoO_3$), indium oxide ($In_2O_3$ or $In_2O$), tin oxide ($SnO_2$), tantalum oxide ($Ta_2O_5$), tungsten oxide ($WO_3$ or $W_2O_5$), lead oxide (PbO or $PbO_2$), bismuth oxide ($Bi_2O_3$), cerium oxide ($CeO_2$ or $Ce_2O_3$), antimony oxide ($Sb_2O_3$ or $Sb_2O_5$), germanium oxide ($GeO_2$ or GeO), lanthanum oxide ($La_2O_3$), ruthenium oxide ($RuO_2$), and the like.

The above inorganic oxides may be used singly, or plural kinds thereof may be used in combination.

The inorganic oxide is preferably titanium oxide, aluminum oxide, or zinc oxide.

The inorganic oxide in the surface-modified inorganic substance of the present invention may be an oxide generated in a case where a metal prepared as a non-oxide is oxidized due to the environment or the like.

The inorganic nitride is not particularly limited, and examples thereof include boron nitride (BN), carbon nitride ($C_3N_4$), silicon nitride ($Si_3N_4$), gallium nitride (GaN), indium nitride (InN), aluminum nitride (AlN), chromium nitride ($Cr_2N$), copper nitride ($Cu_3N$), iron nitride ($Fe_4N$), iron nitride ($Fe_3N$), lanthanum nitride (LaN), lithium nitride ($Li_3N$), magnesium nitride ($Mg_3N_2$), molybdenum nitride ($Mo_2N$), niobium nitride (NbN), tantalum nitride (TaN), titanium nitride (TiN), tungsten nitride ($W_2N$), tungsten nitride ($WN_2$), yttrium nitride (YN), zirconium nitride (ZrN), and the like.

The above inorganic nitrides may be used singly, or plural kinds thereof may be used in combination.

The inorganic nitride in the surface-modified inorganic substance of the present invention preferably includes aluminum, boron, or silicon, and is preferably aluminum nitride, boron nitride, or silicon nitride.

[Boronic Acid Compound]

The surface modification of the surface-modified inorganic substance is performed using a boronic acid compound. The boronic acid compound has a structure in which one or more hydroxyl groups of boric acid are substituted with an organic group such as a hydrocarbon group. By being adsorbed onto an inorganic substance generally through the boron portion, the boronic acid compound modifies the surface of an inorganic substance. The boronic acid compound may be a compound represented by General Formula I, for example.

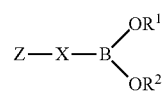

General Formula I

In General Formula I, Z represents an amino group, a thiol group, a hydroxyl group, an isocyanate group, a carboxyl group, a carboxylic acid anhydride group, a polymerizable group, a hydrogen atom, a halogen atom, a quaternary ammonium group or a salt thereof, or a quaternary pyridinium group or a salt thereof. The quaternary pyridinium group may have a substituent.

In the present specification, an oxiranyl group is a functional group referred to as an epoxy group as well. The oxiranyl group may be a group including oxacyclopropane (oxirane), and also includes a group, in which two adjacent carbon atoms in a saturated hydrocarbon ring group form an oxirane ring by being bonded to each other through an oxo group (—O—), and the like, for example.

In the present specification, in a case where "hydroxyl group" is exemplified as a functional group, the hydroxyl group is preferably a hydroxyl group directly bonded to an aromatic ring such as a phenyl group. Furthermore, the carboxylic acid anhydride group may be a substituent obtained by removing any hydrogen atom from an acid anhydride such as maleic acid anhydride, phthalic acid anhydride, pyromellitic acid anhydride, or trimellitic acid anhydride.

X represents a divalent linking group. X contains at least one linking group A selected from the group consisting of a divalent aliphatic hydrocarbon group which may have a substituent, an arylene group which may have a substituent, and a heteroarylene group which may have a substituent. X may contain one or more linking groups B selected from the group consisting of —O—, —CO—, —NH—, —CO—NH—, —COO—, and —O—COO—. That is, X is the linking group A, a linking group constituted with a combination of two or more linking groups A, or a linking group constituted with a combination of one or more linking groups A and one or more linking groups B.

$R^1$ and $R^2$ each independently represent a hydrogen atom, an aliphatic hydrocarbon group which may have a substituent, an aryl group which may have a substituent, or a heteroaryl group which may have a substituent.

$R^1$ and $R^2$ may be linked through an alkylene linking group, an arylene linking group, or a linking group as a combination of an alkylene linking group and an arylene linking group.

The divalent aliphatic hydrocarbon group which may have a substituent includes an alkylene group which may have a substituent and an alkenylene group which may have a substituent.

The aliphatic hydrocarbon group which may have a substituent that is represented by each of $R^1$ and $R^2$ include an alkyl group which may have a substituent, an alkenyl group which may have a substituent, and an alkynyl group which may have a substituent.

In the present specification, the alkyl group may be linear, branched, or cyclic. The number of carbon atoms in the alkyl group is preferably 1 to 30, and more preferably 2 to 10. Specific examples of the alkyl group include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, a sec-butyl group, a tert-butyl group, an isopentyl group, a neopentyl group, a 1-methylbutyl group, an isohexyl group, a 2-methylhexyl group, a cyclopentyl group, a cyclohexyl group, a 1-adamantyl group, a 2-norbornyl group, and the like. The above description relating to the alkyl group is also applied to other groups such as an alkyl group-containing alkoxy group. The alkylene group is a group obtained by removing a certain hydrogen atom from the alkyl group, and examples of the alkylene group include the groups obtained by removing a certain hydrogen atom from each of the aforementioned examples of the alkyl group.

In the present specification, the alkenyl group may be linear, branched, or cyclic. The number of carbon atoms in the alkenyl group is preferably 2 to 30, and more preferably 2 to 10. Specific examples of the alkenyl group include a vinyl group, a 1-propenyl group, a 1-butenyl group, a 1-methyl-1-propenyl group, a 1-cyclopentenyl group, a 1-cyclohexenyl group, and the like. The above description relating to the alkenyl group is also applied to other groups containing the alkenyl group. The alkenylene group is a group obtained by removing a certain hydrogen atom from the alkenyl group, and examples of the alkenylene group include the groups obtained by removing a certain hydrogen atom from each of the aforementioned examples of the alkenyl group.

The number of carbon atoms in the alkynyl group is preferably 2 to 30, and more preferably 2 to 10. Specific examples of the alkynyl group include an ethynyl group, a 1-propynyl group, a 1-butynyl group, a 1-octynyl group, and the like.

The aryl group may be a monocyclic group or a ring-fused group containing two or more rings. The number of carbon atoms in the aryl group is preferably 5 to 18, and more preferably 5 to 10. Specific examples of the aryl group include a phenyl group, a naphthyl group, an anthryl group, a phenanthryl group, an indenyl group, an acenaphthenyl group, a fluorenyl group, a pyrenyl group, and the like. The arylene group is a group obtained by removing any hydrogen atom from the aryl group, and examples of the arylene group include the groups obtained by removing any hydrogen atom from each of the aforementioned examples of the aryl group.

Examples of the heteroaryl group include heteroaryl groups obtained by removing one hydrogen atom on a heterocyclic aromatic ring containing one or more hetero atoms selected from the group consisting of a nitrogen atom, an oxygen atom, and a sulfur atom. Specific examples of the heterocyclic aromatic ring containing one or more hetero atoms selected from the group consisting of a nitrogen atom, an oxygen atom, and a sulfur atom include pyrrole, furan, thiophene, pyrazole, imidazole, triazole, oxazole, isoxazole, oxadiazole, thiazole, thiadiazole, indole, carbazole, benzofuran, dibenzofuran, thianaphthene, dibenzothiophene, indazole benzimidazole, anthranyl, benzisoxazole, benzoxazole, benzothiazole, purine, pyridine, pyridazine, pyrimidine, pyrazine, triazine, quinoline, acridine, isoquinoline, phthalazine, quinazoline, quinoxaline, naphthyridine, phenanthroline, pteridine, and the like. The heteroarylene group is a group obtained by removing a certain hydrogen atom from the heteroaryl group, and examples of the heteroarylene group include the groups obtained by removing a certain hydrogen atom from each of the aforementioned examples of the heteroaryl group.

In the present specification, in a case where the description of "may have a substituent" appears, the type of a substituent, the position of a substituent, and the number of substituents are not particularly limited. The number of substituents may, for example, be 1, 2, 3, or greater. Examples of the substituent include a group of monovalent nonmetallic atoms excluding hydrogen, and the substituent can be selected from the following substituent group Y for example.

Substituent group Y: halogen atom (—F, —Br, —Cl, or —I), a hydroxyl group, an alkoxy group, an aryloxy group, a mercapto group, an alkylthio group, an arylthio group, an alkyldithio group, an aryldithio group, an amino group, a N-alkylamino group, a N,N-dialkylamino group, a N-arylamino group, a N,N-diarylamino group, a N-alkyl-N-arylamino group, an acyloxy group, a carbamoyloxy group, a N-alkylcarbamoyloxy group, a N-arylcarbamoyloxy group, a N,N-dialkylcarbamoyloxy group, a N,N-diarylcarbamoyloxy group, a N-alkyl-N-arylcarbamoyloxy group, an alkylsulfoxy group, an arylsulfoxy group, an acylthio group, an acylamino group, a N-alkylacylamino group, a N-arylacylamino group, a ureide group, a N'-alkylarylureide group, a N',N'-dialkylureide group, a N'-arylureide group, a N',N'-diarylureide group, a N'-alkyl-N-arylureide group, a N-alkylureide group, a N-arylureide group, a N'-alkyl-N-alkylureide group, a N'-alkyl-N-arylureide group, a N',N'-dialkyl-N-alkylureide group, a N',N'-dialkyl-N-arylureide group, a N'-aryl-N-alkylureide group, a N'-aryl-N-arylureide group, a N',N'-diaryl-N-alkylureide group, a N',N'-diaryl-N-arylureide group, a N'-alkyl-N'-aryl-N-alkylureide group, a N'-alkyl-N'-aryl-N-arylureide group, an alkoxycarbonylamino group, an aryloxycarbonylamino group, a N-alkyl-N-alkoxycarbonylamino group, a N-alkyl-N-aryloxycarbonylamino group, a N-aryl-N-alkoxycarbonylamino group, a N-aryl-N-aryloxycarbonylamino group, a formyl group, an acyl group, a carboxyl group and a conjugated base group thereof, an alkoxycarbonyl group, an aryloxycarbonyl group, a carbamoyl group, a N-alkylcarbamoyl group, a N,N-dialkylcarbamoyl group, a N-arylcarbamoyl group, a N,N-diarylcarbamoyl group, a N-alkyl-N-arylcarbamoyl group, an alkylsufinyl group, an arylsulfinyl group, an alkylsulfonyl group, an arylsulfonyl group, a sulfo group (—SO$_3$H) and a conjugated base group thereof, an alkoxysulfonyl group, an aryloxysulfonyl group, a sulfinamoyl group, a N-alkylsulfinamoyl group, a N,N-dialkylsulfinamoyl group, a N-arylsulfinamoyl group, a N,N-diarylsulfinamoyl group, a N-alkyl-N-arylsulfinamoyl group, a sulfamoyl group, a N-alkylsulfamoyl group, a N,N-dialkylsulfamoyl group, a N-arylsulfamoyl group, a N,N-diarylsulfamoyl group, a N-alkyl-N-arylsulfamoyl group, a N-acylsulfamoyl group and a conjugated base group thereof, a N-alkylsulfonylsulfamoyl group (—SO$_2$NHSO$_2$(alkyl)) and a conjugated base group thereof, a N-arylsulfonylsulfamoyl group (—SO$_2$NHSO$_2$(aryl)) and a conjugated base group thereof, a N-alkylsulfonylcarbamoyl group (—CONHSO$_2$(alkyl)) and a conjugated base group thereof, a N-arylsulfonylcarbamoyl group (—CONHSO$_2$(aryl)) and a conjugated base group thereof, an alkoxysilyl group (—Si(Oalkyl)$_3$), an aryloxysilyl group (—Si(Oaryl)$_3$), a hydroxysilyl group (—Si(OH)$_3$) and a conjugated base group thereof, a phosphono group (—PO$_3$H$_2$) and a conjugated base group thereof, a dialkylphosphono group (—PO$_3$(alkyl)$_2$), a diarylphosphono group (—PO$_3$(aryl)$_2$), an alkylarylphosphono group (—PO$_3$(alkyl)(aryl)), a monoalkylphosphono group (—PO$_3$H(alkyl)) and a conjugated base group thereof, a monoarylphosphono group (—PO$_3$H(aryl)) and a conjugated base group thereof, a phosphonooxy group (—OPO$_3$H$_2$) and a conjugated base group thereof, a dialkylphosphonooxy group (—OPO$_3$(alkyl)$_2$), a diarylphosphonooxy group (—OPO$_3$(aryl)$_2$), an alkylarylphosphonooxy group (—OPO$_3$(alkyl)(aryl)), a monoalkylphosphonooxy group (—OPO$_3$H(alkyl)) and a conjugated base group thereof, a monoarylphosphonooxy group (—OPO$_3$H(aryl)) and a conjugated base group thereof, a cyano group, a nitro group, an aryl group, an alkenyl group, and an alkynyl group.

These substituents may form a ring with each other if possible or may form a ring by being bonded to the group substituted with the substituents.

Examples of the polymerizable group include a (meth)acrylate group, a styryl group, a vinyl ketone group, a butadiene group, a vinyl ether group, an oxiranyl group, an aziridinyl group, an oxetane group, and the like. Among these, a (meth)acrylate group, a styryl group, an oxiranyl group, or an oxetane group is more preferable, and a (meth)acrylate group or an oxiranyl group is even more preferable.

R$^1$ and R$^2$ in General Formula I are preferably a hydrogen atom.

X in General Formula I is preferably a linking group containing a phenylene group which may have at least one substituent, and more preferably a linking group having a partial structure to which a phenylene group which may have two substituents is linked through —COO—. Furthermore, X is preferably a linking group containing an unsubstituted phenylene group. It is particularly preferable that the unsubstituted phenylene group is directly bonded to a boron atom of the boronic acid.

Z in General Formula I is preferably an amino group, a thiol group, a hydroxyl group, an isocyanate group, a carboxyl group, a carboxylic acid anhydride group, a (meth)acrylate group, an oxiranyl group, or a hydrogen atom, more preferably an amino group, a thiol group, a hydroxyl group, an isocyanate group, a carboxyl group, or a carboxylic acid anhydride group, and even more preferably an amino group, a thiol group, or a hydroxyl group. Particularly, in a case where the resin composition contains a curing agent having a group selected from the group consisting of an amino group, a thiol group, a hydroxyl group, an isocyanate group, a carboxyl group, or carboxylic acid anhydride group as a curing agent, Z in General Formula I is also preferably an oxiranyl group.

The boronic acid compound preferably has a chain-like structure, because then a monolayer is easily formed.

Preferred examples of the boronic acid compound represented by General Formula I will be shown below, but the present invention is not limited thereto.

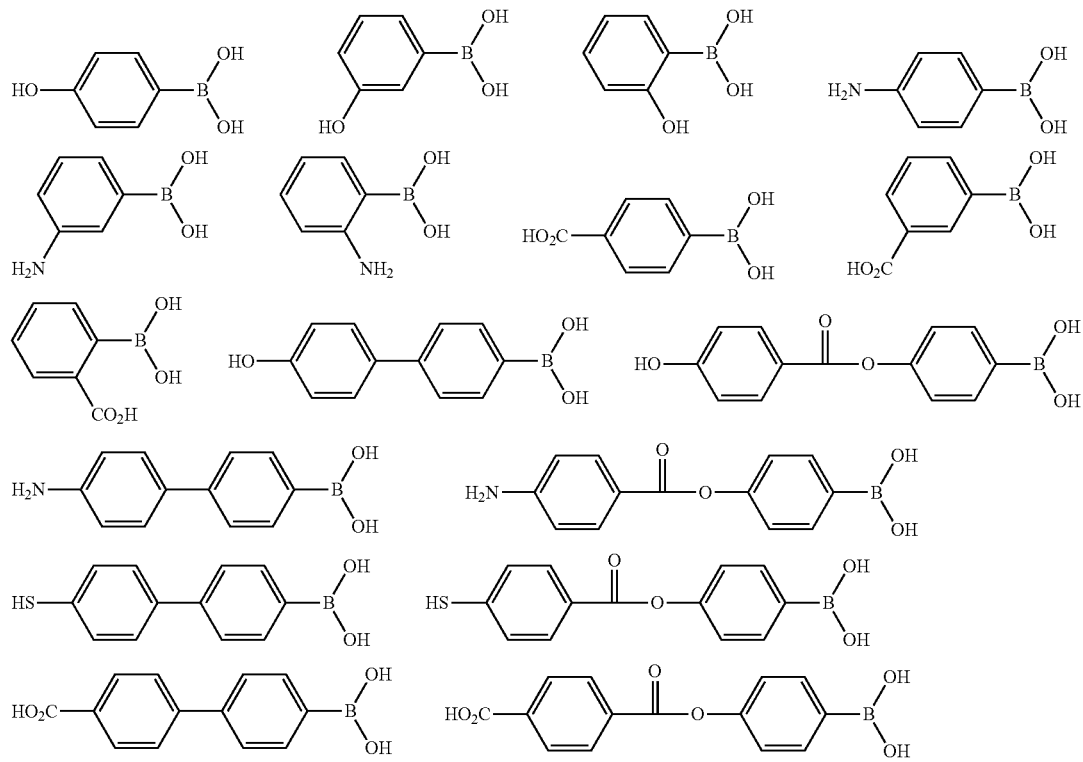

-continued
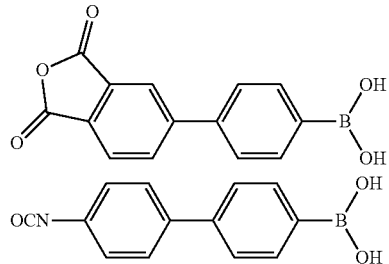
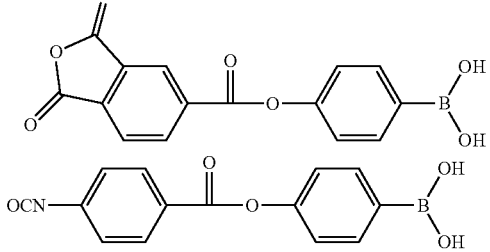
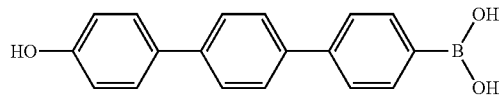
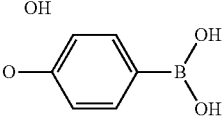
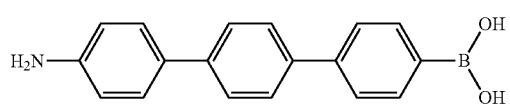
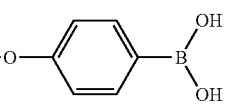
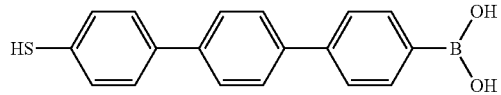
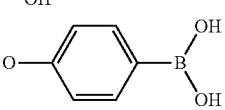
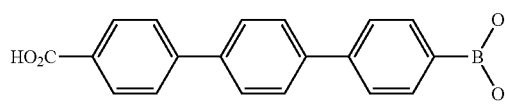
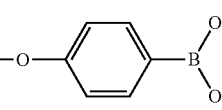
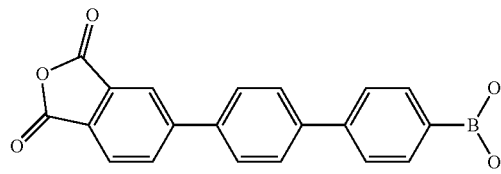
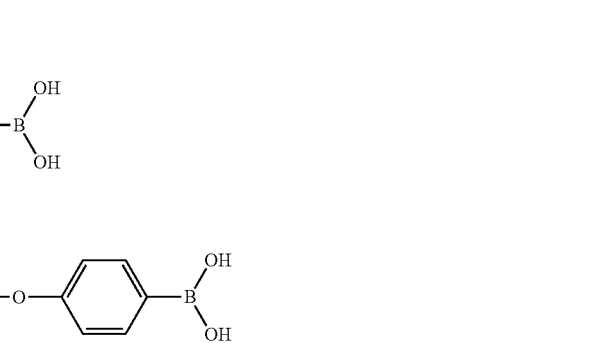
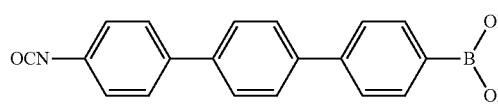
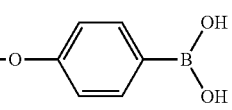
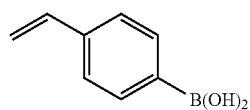
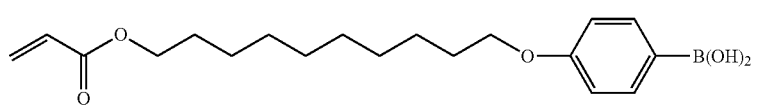

-continued
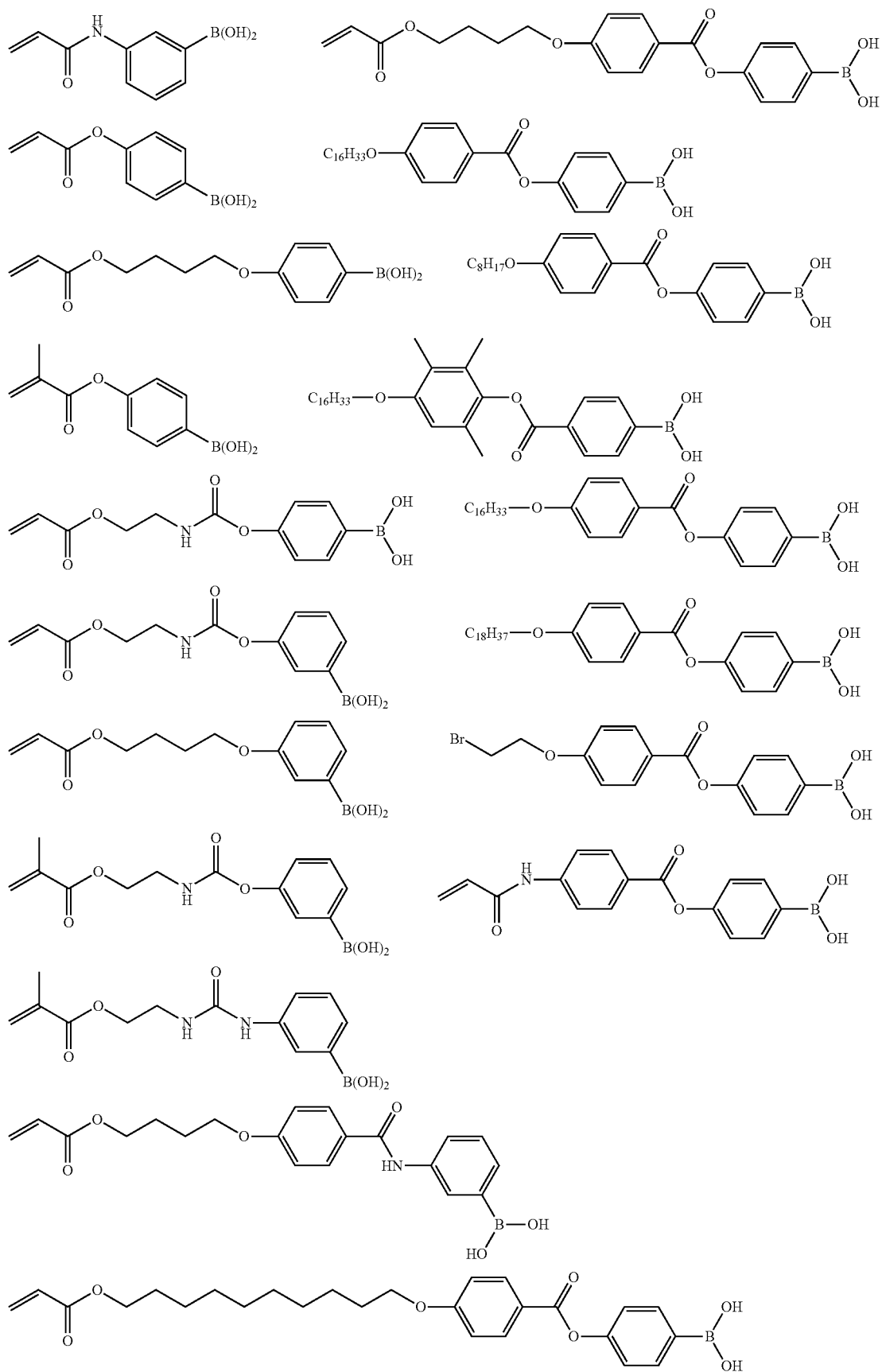

-continued
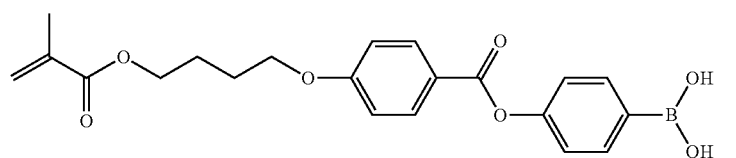
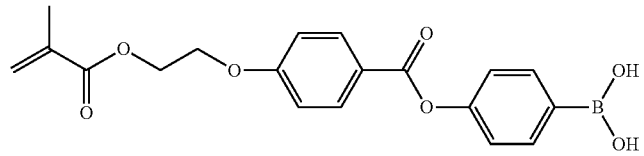
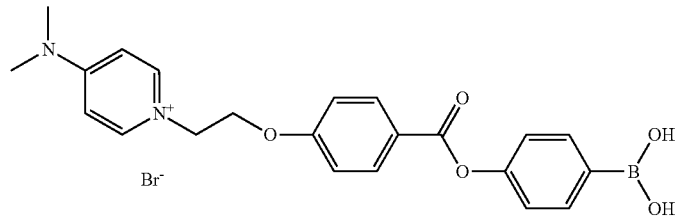
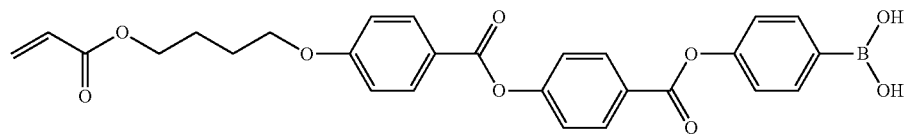
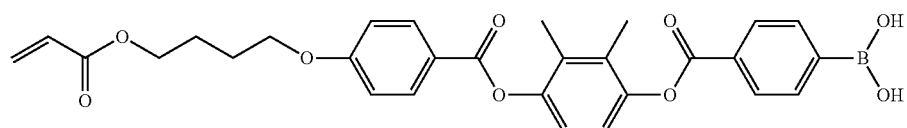
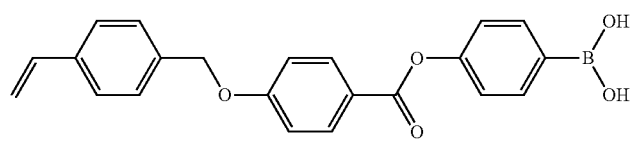
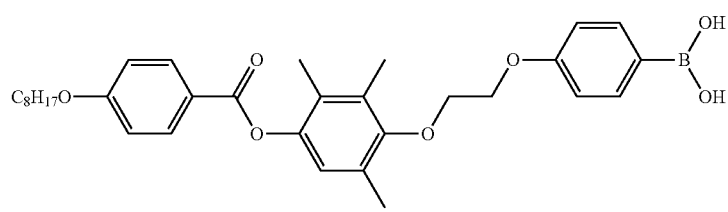
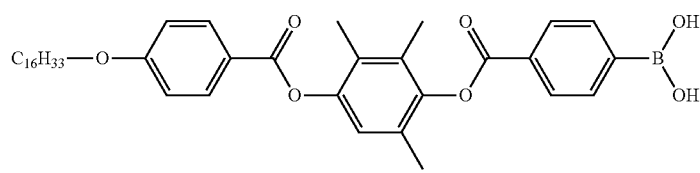
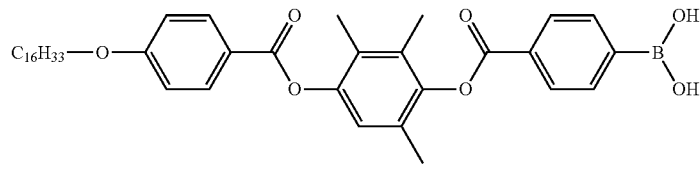
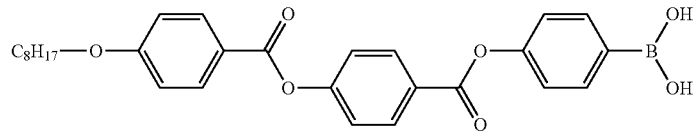

-continued
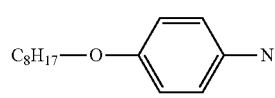 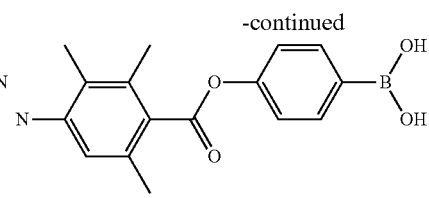
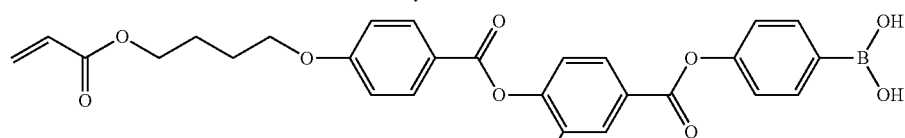
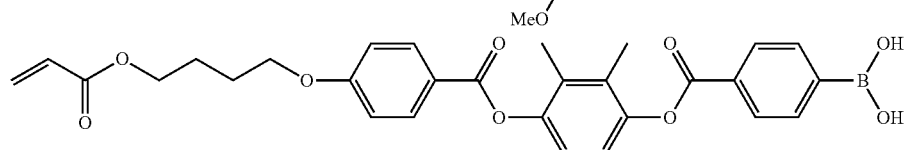
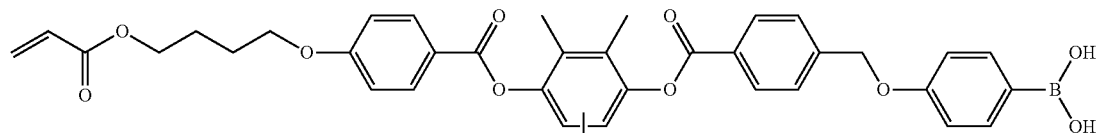
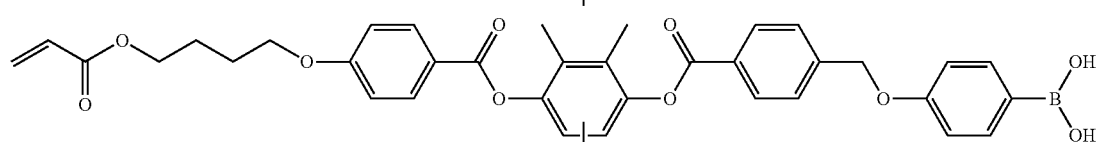
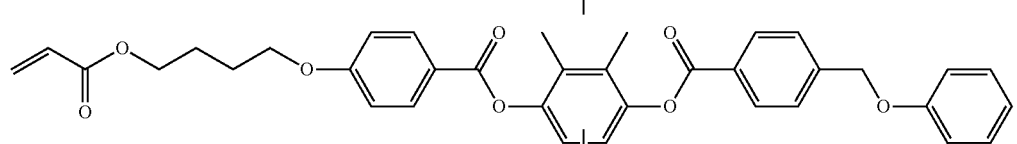
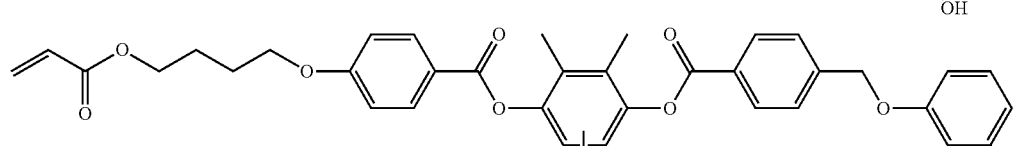
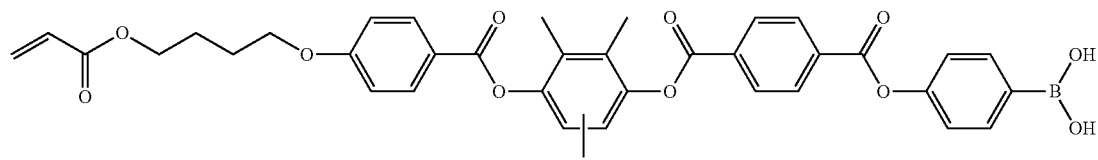
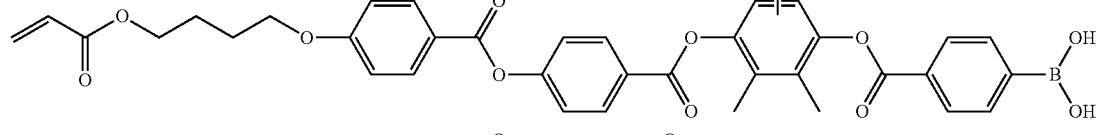
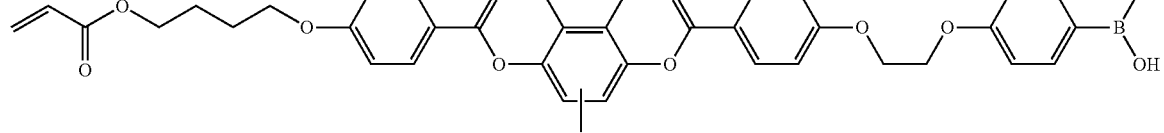

-continued
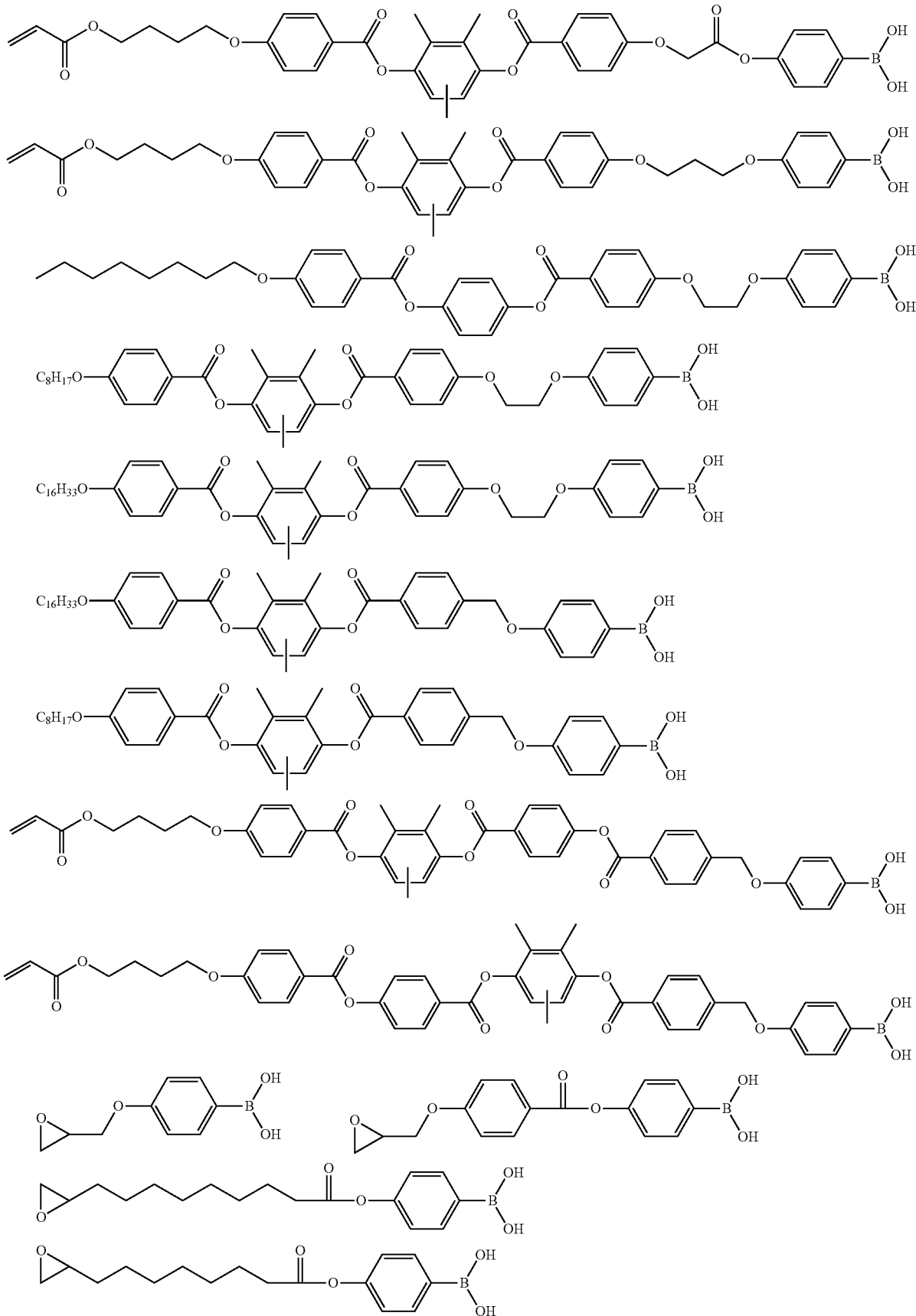

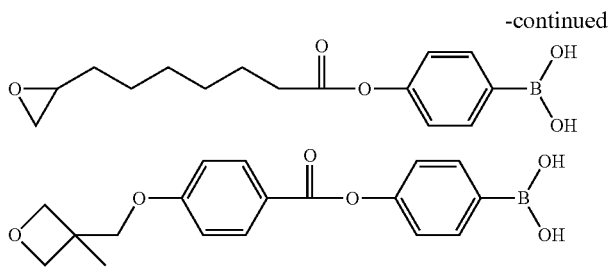
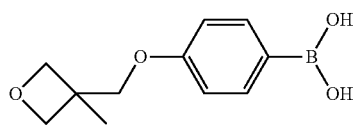

Furthermore, a boronic acid compound represented by the following General Formula II may be used.

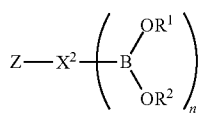

General Formula II

In General Formula II, Z, $R^1$, and $R^2$ each have the same definition as in General Formula I, and the preferred range thereof is also the same.

$X^2$ is an (n+1)-valent linking group obtained by further removing certain (n−1) hydrogen atoms from the divalent linking group represented by X described above. At this time, the preferred range of X is the same as that described above. $X^2$ is preferably an (n+1)-valent linking group obtained by further removing hydrogen atoms from either the linking group A or a divalent linking group constituted with a combination of two or more linking groups A. At this time, the linking group A is preferably an arylene group which may have a substituent or a heteroarylene group which may have a substituent, and more preferably a phenyl group or a divalent group formed by removing hydrogen atoms from pyrrole, furan, or thiophene.

n is an integer equal to or greater than 2. n is preferably 2 to 10, and more preferably 3.

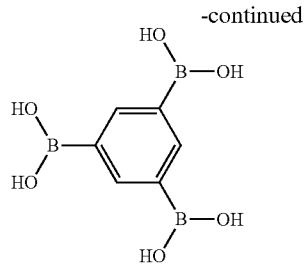

In the present specification, a compound, which is easily decomposed by being brought into contact with an inorganic substance or easily decomposed in a solvent and generates the aforementioned boronic acid compound, is also included in the boronic acid compound.

Examples of such a compound include a compound in which the hydrogen of one or two hydroxyl groups bonded to a boron in the boronic acid compound is substituted with a substituent other than a hydrogen atom, and a compound which has, instead of the boronic acid (—B(OH)$_2$) moiety of the boronic acid compound, a moiety having a structure that brings about the same effect as (—B(OH)$_2$) through equilibrium or adsorption in a case of contacting the inorganic substance. Specific examples of the compound which is easily decomposed and generates the boronic acid compound by being brought into contact with an inorganic substance include compounds having a partial structure represented by any of the following formulae. All of the partial structures represented by the following formulae may have a substituent in a substitutable moiety.

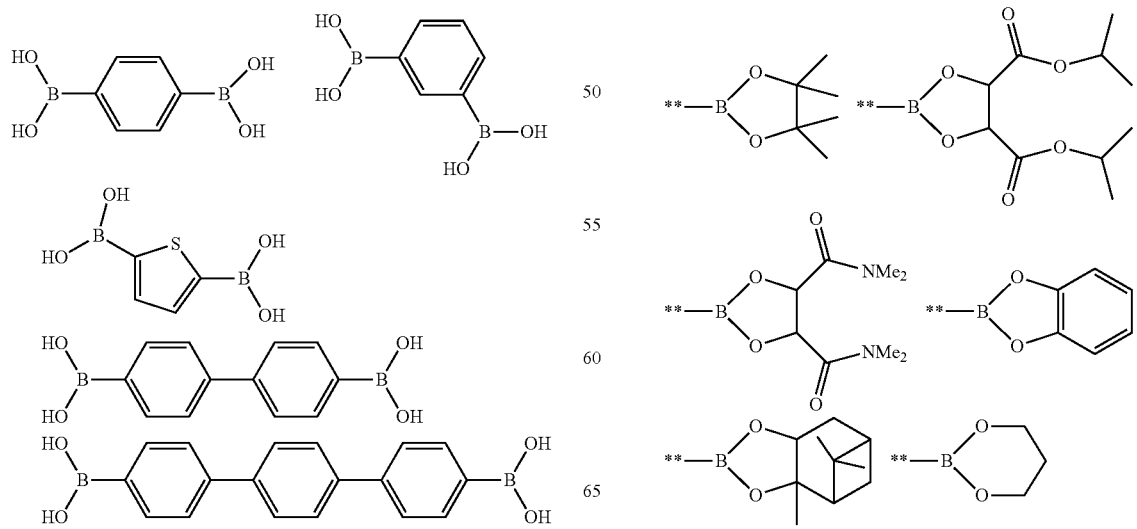

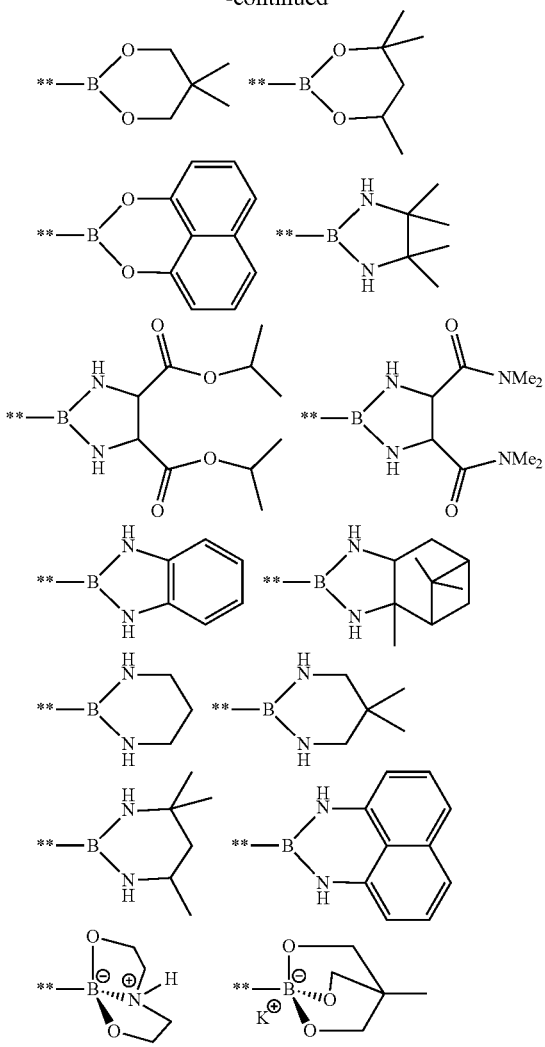

As the boronic acid compound, a boronic acid compound is also preferable which is easily decomposed by being brought into contact with an inorganic substance or easily decomposed in a solvent and generates the boronic acid compound represented by General Formula I or General Formula II described above. Examples of such a compound include the following ones.

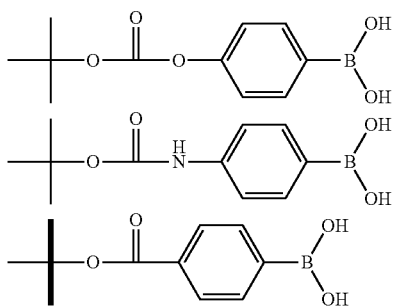

As the boronic acid compound, a commercial boronic acid compound may be used as it is. Alternatively, the boronic acid compound may be synthesized by using a boronic acid compound having a substituent as a raw material through a general synthesis reaction such as esterification, amidation, or alkylation. For example, the boronic acid compound can be synthesized from a halide (such as aryl bromide) by using n-butyl lithium and trialkoxyborane (such as trimethoxyborane) or synthesized by performing a Wittig reaction using metallic magnesium.

[Method for Manufacturing Surface-Modified Inorganic Substance]

The surface-modified inorganic substance can be easily manufactured by making a contact between an inorganic substance and the boronic acid compound. The contact between the inorganic substance and the boronic acid compound can be established by, for example, stirring a solution containing an inorganic nitride or an inorganic oxide and the boronic acid compound. Particularly, in a case where the inorganic nitride or the inorganic oxide is granular, it is preferable to make the contact by stirring.

A solvent of the aforementioned solution is not particularly limited, but is preferably an organic solvent. Examples of the organic solvent include ethyl acetate, methyl ethyl ketone, dichloromethane, tetrahydrofuran (THF), and the like.

The aforementioned solution may contain other components, such as an epoxy compound, in the resin composition of the present invention. From a composition containing an inorganic substance, a boronic acid compound, and an epoxy compound, it is possible to easily manufacture a resin composition containing a surface-modified inorganic substance and an epoxy compound.

A mixing ratio between the inorganic substance and the boronic acid compound may be determined in consideration of the structure such as the structure and the surface area of the inorganic substance, the aspect ratio of the molecule of the boronic acid compound, and the like.

The stirring conditions are not particularly limited. For example, stirring may be performed at room temperature or may be performed for about 1 to 10 seconds at a stirring rotation speed of about 50 rpm.

<Epoxy Compound>

The epoxy compound used in the present invention may be a monomer that can be polymerized by curing the resin composition. The epoxy compound has at least one oxiranyl group.

The epoxy compound may have a polymerizable group other than an oxiranyl group, but it is preferable that the epoxy compound contains only an oxiranyl group as a polymerizable group. Furthermore, the epoxy compound may have a functional group other than a polymerizable group. It is preferable that the epoxy compound contains only an oxiranyl group as a functional group.

As the epoxy compound, it is possible to use various epoxy resin monomers known in the related art. For example, it is possible to use the epoxy resin monomer described in "0028" in JP4118691B, the epoxy compound described in "0006" to "0011" in JP2008-13759A, the epoxy resin mixture described in "0032" to "0100" in JP2013-227451A, the epoxy compound described in "0048" to "0054" in JP2016-801A, and the like. Furthermore, as the epoxy compound, a liquid crystal compound which will be described later may be used.

The content of the epoxy compound in the resin composition with respect to the mass of total solid contents of the resin composition (mass of the solid contents except for a solvent) is preferably 10% by mass to 90% by mass, more preferably 20% by mass to 70% by mass, and even more preferably 30% by mass to 60% by mass.

[Liquid Crystal Compound]

As the epoxy compound, a liquid crystal compound may also be used. The liquid crystal compound may be a rod-like liquid crystal compound or a disk-like liquid crystal compound.

The liquid crystal compound used as the epoxy compound is a polymerizable liquid crystal compound having at least one oxiranyl group. The liquid crystal compound may have a polymerizable group other than an oxiranyl group, but it is preferable that the liquid crystal compound contains only an oxiranyl group as a polymerizable group. Furthermore, the liquid crystal compound may have a functional group other than a polymerizable group. The liquid crystal compound preferably has two or more polymerizable groups and preferably has two or more oxiranyl groups.

The resin composition of the present invention may contain a liquid crystal compound that does not correspond to the epoxy compound, in addition to the epoxy compound.

(Rod-Like Liquid Crystal Compound)

As the rod-like liquid crystal compound, azomethines, azoxies, cyanobiphenyls, cyanophenyl esters, benzoic acid esters, cyclohexane carboxylic acid phenyl esters, cyanophenyl cyclohexanes, cyano-substituted phenylpyrimidines, alkoxy-substituted phenylpyrimidines, phenyldioxanes, tolans, and alkenylcyclohexyl benzonitriles are preferably used. In addition to these low-molecular weight liquid crystal compounds, high-molecular weight liquid crystal compounds can also be used. The aforementioned high-molecular weight liquid crystal compounds are polymer compounds obtained by polymerizing rod-like liquid crystal compounds having a low-molecular weight reactive group. As rod-like liquid crystal compounds that are particularly preferably used, a rod-like liquid crystal compound represented by General Formula (XXI) can be exemplified.

$Q^1\text{-}L^{111}\text{-}A^{111}\text{-}L^{113}\text{-}M\text{-}L^{114}\text{-}A^{112}\text{-}L^{112}\text{-}Q^2$   General Formula (XXI):

In the formula, $Q^1$ and $Q^2$ each independently represent a polymerizable group, and $L^{111}$, $L^{112}$, $L^{113}$, and $L^{114}$ each independently represent a single bond or a divalent linking group. $A^{111}$ and $A^{112}$ each independently represent a spacer group having 2 to 20 carbon atoms. M represents a mesogenic group.

At least one of $Q^1$ and $Q^2$ preferably represents an oxiranyl group. It is more preferable that both of $Q^1$ and $Q^2$ represent an oxiranyl group.

As the divalent linking group represented by $L^{111}$, $L^{112}$, $L^{113}$, and $L^{114}$, a divalent linking group is preferable which is selected from the group consisting of —O—, —S—, —NR$^{112}$—, —CO—O—, —O—CO—O—, —CO—NR$^{112}$—, —NR$^{112}$—CO—, —O—CO—, —O—CO—NR$^{112}$—, —NR$^{112}$—CO—O—, and NR$^{112}$—CO—NR$^{112}$—. $R^{112}$ is an alkyl group having 1 to 7 carbon atoms or a hydrogen atom. In Formula (I), $Q^1$-$L^{111}$ and $Q^2$-$L^{111}$- preferably each represent $CH_2$=CH—CO—O—, $CH_2$=C($CH_3$)—CO—O—, or $CH_2$=C(Cl)—CO—O—CO—O—, and most preferably each represent $CH_2$=CH—CO—O—.

$A^{111}$ and $A^{112}$ each represent a spacer group having 2 to 20 carbon atoms. $A^{111}$ and $A^{112}$ preferably each represent an alkylene group having 2 to 12 carbon atoms, an alkenylene group, or an alkynylene group, and particularly preferably each represent an alkylene group. The spacer group is preferably in the form of a chain, and may include oxygen atoms or sulfur atoms that are not adjacent to each other. Furthermore, the spacer group may have a substituent, and may be substituted with a halogen atom (fluorine, chlorine, or bromine), a cyano group, a methyl group, or an ethyl group.

Examples of the mesogenic group represented by M include all the known mesogenic groups. Particularly, a group represented by General Formula (XXII) is preferable.

—$(-W^1\text{-}L^{115})_n\text{-}W^2$—   General Formula (XXII):

In the formula, $W^1$ and $W^2$ each independently represent a divalent cyclic alkylene or alkenylene group, a divalent aryl group, or a divalent heterocyclic group, $L^{115}$ represents a single bond or a linking group. Specific examples of the linking group include the specific examples of the groups represented by $L^{111}$ to $L^{114}$ in Formula (XXI), —$CH_2$—O—, and —O—$CH_2$—. n represents 1, 2, or 3.

Examples of $W^1$ and $W^2$ include 1,4-cyclohexanediyl, 1,4-phenylene, pyrimidine-2,5-diyl, pyridine-2,5-diyl, 1,3,4-thiadiazole-2,5-diyl, 1,3,4-oxadiaole-2,5-diyl, naphthalene-2,6-diyl, naphthalene-1,5-diyl, thiophene-2,5-diyl, and pyridazine-3,6-diyl. In a case where $W^1$ and $W^2$ represent 1,4-cyclohexanediyl, there may be constitutional isomers of a trans-isomer and a cis-isomer. Any of these isomers may be adopted, or a mixture in which the isomers are mixed at any ratio may be adopted. The isomer is more preferably a trans-isomer. Each of $W^1$ and $W^2$ may have a substituent. Examples of the substituent include a halogen atom (fluorine, chlorine, bromine, or iodine), a cyano group, an alkyl group having 1 to 10 carbon atoms (a methyl group, an ethyl group, a propyl group, or the like), an alkoxy group having 1 to 10 carbon atoms (a methoxy group, an ethoxy group, or the like), an acyl group having 1 to 10 carbon atoms (a formyl group, an acetyl group, or the like), an alkoxycarbonyl group having 1 to 10 carbon atoms (a methoxycarbonyl group, an ethoxycarbonyl group, or the like), an acyloxy group having 1 to 10 carbon atoms (an acetyloxy group, a propionyloxy group, or the like), a nitro group, a trifluoromethyl group, a difluoromethyl group, and the like.

Examples of those preferred as the basic skeleton of the mesogenic group represented by General Formula (XXII) described above will be shown below, and these may be substituted with the aforementioned substituent.

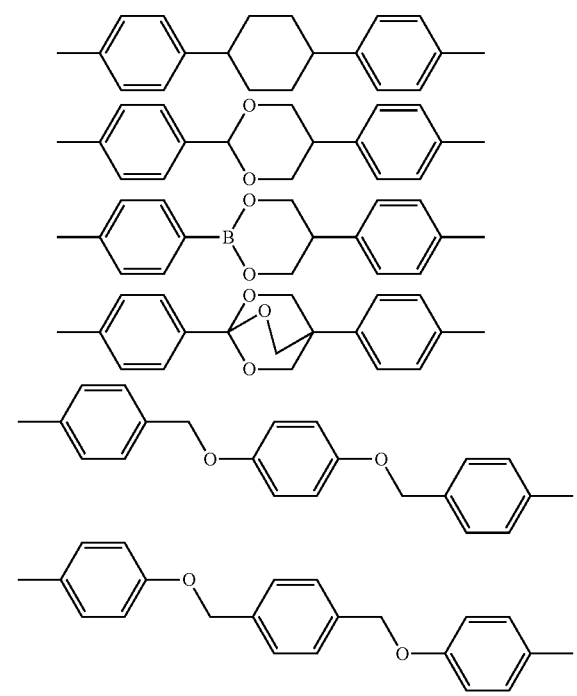

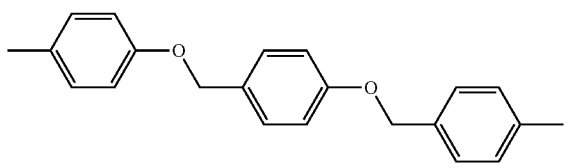
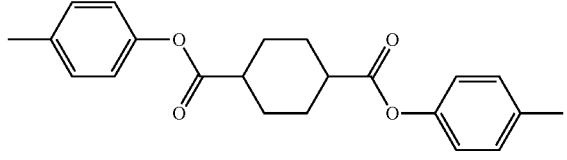
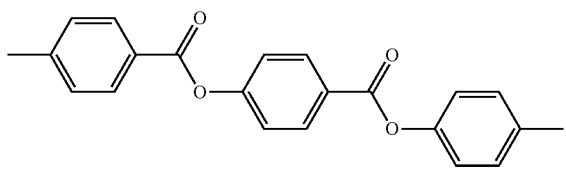
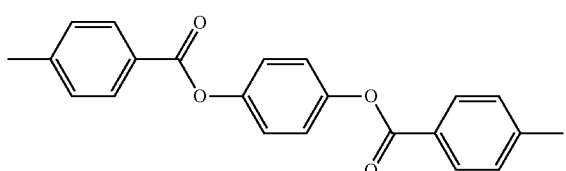
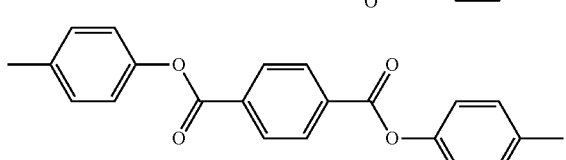
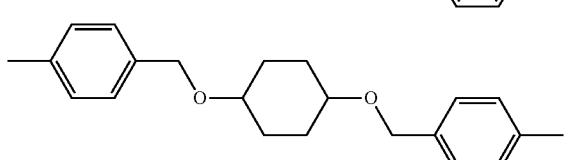
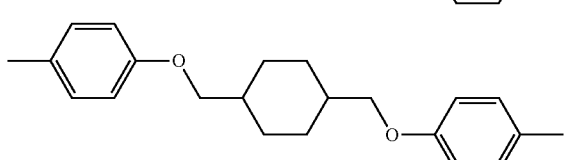
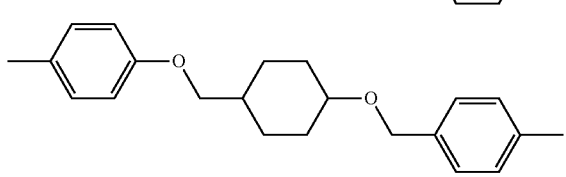
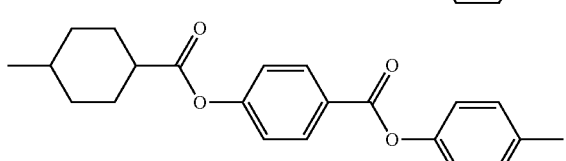
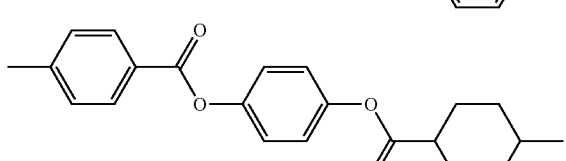
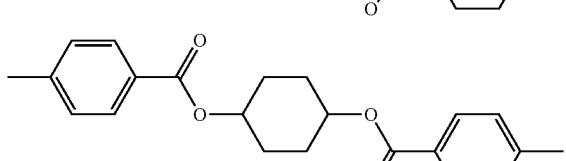

The compound represented by General Formula (XXI) can be synthesized with reference to the method described in JP1999-513019A (JP-H11-513019A) (WO97/00600) and JP2013-227451A.

The rod-like liquid crystal compound may be a monomer having the mesogenic group described in JP1999-323162A (JP-H11-323162A) and JP4118691B.

(Disk-Like Liquid Crystal Compound)

The disk-like liquid crystal compound has a disk-like structure in at least a portion thereof. The disk-like structure refers to a compound which has at least an aromatic ring and can form a columnar structure by forming a stacking structure based on the intermolecular π-π interaction. Specific examples of the disk-like structure include the triphenylene structure described in Angew. Chem. Int. Ed. 2012, 51, 7990-7993 or JP1995-306317A (JP-H07-306317A), the tri-substituted benzene structure described in JP2007-2220A or JP2010-244038A, and the like.

It is also preferable that the resin composition of the present invention contains a compound which has the aforementioned disk-like structure but does not exhibit liquid crystallinity.

The inventor of the present invention has found that the compound having a disk-like structure brings about high thermal conductivity. Regarding such high thermal conductivity, the inventor does not stick to a specific theory but considers that while the rod-like compound can only linearly (one-dimensionally) conduct heat, the disk-like compound can flatwise (two-dimensionally) conduct heat in a normal direction, and accordingly, the number of heat conduction paths increase, and the thermal conductivity is improved.

Furthermore, by the addition of the compound having a disk-like structure, the heat resistance of a cured substance of the resin composition can be improved. In order to improve the heat resistance, it is more preferable that the compound having a disk-like structure have three or more functional groups.

It is preferable that disk-like liquid crystal compound has three or more functional groups. The cured substance of the resin composition containing a monomer having three or more functional groups tends to have a high glass transition temperature and high heat resistance. Compared to a compound having a rod-like structure, the disk-like compound more likely to have three or more functional groups without affecting the characteristics of a mesogenic portion. The number of functional groups in the disk-like compound is preferably equal to or smaller than 8, and more preferably equal to or smaller than 6. It is preferable that all the functional groups are oxiranyl groups.

As the disk-like compound, it is preferable to use a compound represented by General Formula (XI) or a compound represented by General Formula (XII) shown below.

General Formula XI

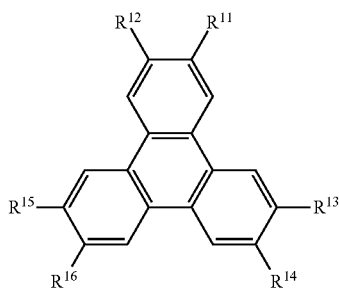

In the formula, $R^{12}$, $R^{13}$, $R^{14}$, $R^{15}$, and $R^{16}$ each independently represent *—$X^{11}$-$L^{11}$-$P^{11}$ or *—$X^{12}$—$Y^{12}$, * represents a position bonded to a triphenylene ring, two or more among $R^{11}$, $R^{12}$, $R^{13}$, $R^{14}$, $R^{15}$ and $R^{16}$ represent *—$X^{11}$-$L^{11}$-$P^{11}$, $X^{11}$ and $X^{12}$ each independently represent a single bond, —O—, —C(=O)—, —OC(=O)—, —OC(=O)O—, —OC(=O)NH—, —OC(=O)S—, —C(=O)O—, —C(=O)NH—, —C(=O)S—, —NHC(=O)—, —NHC(=O)O—, —NHC(=O)NH—, —NHC(=O)S—, —S—, —SC(=O)—, —SC(=O)O—, —SC(=O)NH—, or —SC(=O)S—, $L^{11}$ represents a divalent linking group or a single bond, $P^{11}$ represents a substituent selected from the group consisting of a (meth)acryl group, an oxiranyl group, an oxetanyl group, a hydroxyl group, an amino group, a thiol group, an isocyanate group, a carboxyl group, and a carboxylic acid anhydride group, $Y^{12}$ represents a hydrogen atom, a linear, branched, or cyclic alkyl group having 1 to 20 carbon atoms, or a group obtained in a case where one methylene group or two or more methylene groups in a linear, branched, or cyclic alkyl group having 1 to 20 carbon atoms are substituted with —O—, —S—, —NH—, —N(CH$_3$)—, —C(=O)—, —OC(=O)—, or —C(=O)O—.

It is preferable that three or more out of $R^{11}$, $R^{12}$, $R^{13}$, $R^{14}$, $R^{15}$, and $R^{16}$ represent *—$X^{11}$-$L^{11}$-$P^{11}$. Particularly, it is preferable that any one or more out of $R^{11}$ and $R^{12}$, any one or more out of $R^{13}$ and $R^{14}$, and any one or more out of $R^{15}$ and $R^{16}$ represent *—$X^{11}$-$L^{11}$-$P^{11}$. It is more preferable that all of $R^{11}$, $R^{12}$, $R^{13}$, $R^{14}$, $R^{15}$, and $R^{16}$ represent *—$X^{11}$-$L^{11}$-$P^{11}$. It is particularly preferable that all of $R^{11}$, $R^{12}$, $R^{13}$, $R^{14}$, $R^{15}$, and $R^{16}$ are the same as each other.

$X^{11}$ and $X^{12}$ each independently preferably represent —O—, —OC(=O)—, —OC(=O)O—, —OC(=O)NH—, —C(=O)O—, —C(=O)NH—, —NHC(=O)—, or NHC(=O)O—, more preferably represent —OC(=O)—, —C(=O)O—, —OC(=O)NH—, or C(=O)NH—, and particularly preferably represent —C(=O)O—.

$L^{11}$ represents a divalent linking group or a single bond linking $X^{11}$ and $P^{11}$ to each other. Examples of the divalent linking group include —O—, —OC(=O)—, —C(=O)O—, an alkylene group having 1 to 10 carbon atoms (preferably 1 to 8 carbon atoms and more preferably 1 to 6 carbon atoms), an arylene group having 6 to 20 carbon atoms (preferably 6 to 14 carbon atoms and more preferably 6 to 10 carbon atoms), a group obtained by combining these, and the like. Examples of the alkylene group having 1 to 10 carbon atoms include a methylene group, an ethylene group, a propylene group, a butylene group, a pentylene group, a hexylene group, and the like. Among these, a methylene group, an ethylene group, a propylene group, and a butylene group are preferable. Examples of the arylene group having 6 to 20 carbon atoms include a 1,4-phenylene group, a 1,3-phenylene group, a 1,4-naphthylene group, a 1,5-naphthylene group, an anthracenylene group, and the like. Among these, a 1,4-phenylene group is preferable.

Each of the alkylene group and the arylene group may have a substituent. The substituent includes substituents shown in a substituent group Y, which will be described later, an alkyl group, and an alkenyl group. The number of substituents is preferably 1 to 3, and more preferably 1. The substitution position is not particularly limited. As the substituent, a halogen atom or an alkyl group having 1 to 3 carbon atoms is preferable, and a methyl group is more preferable. It is also preferable that the alkylene group and the arylene group are unsubstituted. Particularly, it is preferable that the alkylene group is unsubstituted.

$P^{11}$ represents a functional group selected from the group consisting of a (meth)acryl group, an oxiranyl group, an oxetanyl group, a hydroxyl group, an amino group, a thiol group, an isocyanate group, a carboxyl group, and a carboxylic acid anhydride group. It is preferable that $P^{11}$ represents an oxiranyl group.

In a case where $P^{11}$ represents a hydroxyl group, $L^{11}$ includes an arylene group, and it is preferable that arylene group is bonded to $P^{11}$.

$Y^{12}$ represents a hydrogen atom, a linear, branched, or cyclic alkyl group having 1 to 20 carbon atoms, or a group obtained in a case where one methylene group or two or more methylene groups in a linear, branched, or cyclic alkyl group having 1 to 20 carbon atoms are substituted with —O—, —S—, —NH—, —N(CH$_3$)—, —C(=O)—, —OC(=O)—, or —C(=O)O—. In a case where $Y^{12}$ represents a linear, branched, or cyclic alkyl group having 1 to 20 carbon atoms or a group obtained in a case where one methylene group or two or more methylene groups in a linear, branched, or cyclic alkyl group having 1 to 20 carbon atoms are substituted with —O—, —S—, —NH—, —N(CH$_3$)—, —C(=O)—, —OC(=O)—, or —C(=O)O—, $Y^{12}$ may be substituted with a halogen atom. Examples of the linear or branched alkyl group having 1 to 20 carbon atoms include a methyl group, an ethyl group, a n-propyl group, an isopropyl group, a n-butyl group, an isobutyl group, a sec-butyl group, a tert-butyl group, a n-pentyl group, an isopentyl group, a neopentyl group, a 1,1-dimethylpropyl group, a n-hexyl group, an isohexyl group, a linear or branched heptyl group, an octyl group, a nonyl group, a decyl group, an undecyl group, and a dodecyl group. The number of carbon atoms in the cyclic alkyl group is preferably 3 to 20, and more preferably equal to or greater than 5. The number of carbon atoms in the cyclic alkyl group is preferably equal to or smaller than 10, more preferably equal to or smaller than 8, and even more preferably equal to or smaller than 6. Examples of the cyclic alkyl group include a cyclopropyl group, a cyclobutyl group, a cyclopentyl group, a cyclohexyl group, a cycloheptyl group, and a cyclooctyl group.

$Y^{12}$ is preferably a hydrogen atom, a linear, branched, or cyclic alkyl group having 1 to 20 carbon atoms, or an alkylene oxide group having 1 to 20 carbon atoms, and more preferably a linear or branched alkyl group having 1 to 12 carbon atoms or an ethylene oxide group or propylene oxide group having 1 to 20 carbon atoms.

Regarding specific examples of the compound represented by General Formula (XI) shown above, those described in paragraphs "0028" to "0036" in JP1995-281028A (JP-H07-281028A), JP1995-306317A (JP-H07-306317A), paragraphs "0016" to "0018" in JP2005-156822A, paragraphs "0067" to "0072" in JP2006-301614A, and Liquid Crystal Handbook (published on 2000 from MARUZEN Co., Ltd.), pp. 330 to 333.

General Formula (XII)

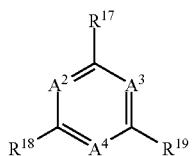

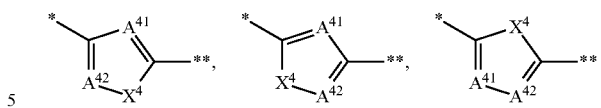

In the formula, $A^2$, $A^3$, and $A^4$ each independently represent —CH= or —N=, $R^{17}$, $R^{18}$, and $R^{19}$ each independently represent *—$X^{211}$—$(Z^{21}$—$X^{212})_{n21}$-$L^{21}$-$P^{21}$ or *—$X^{211}$—$(Z^{22}$—$X^{222})_{n22}$—$Y^{22}$, * represents a position bonded to a central ring, two or more among $R^{17}$, $R^{18}$, and $R^{19}$ represent *—$X^{211}$—$(Z^{21}$—$X^{212})_{n21}$-$L^{21}$-$P^{21}$, $X^{211}$ and $X^{212}$ each independently represent a single bond, —O—, —C(=O)—, —OC(=O)—, —OC(=O)O—, —OC(=O)NH—, —OC(=O)S—, —C(=O)O—, —C(=O)NH—, —C(=O)S—, —NHC(=O)—, —NHC(=O)O—, —NHC(=O)NH—, —NHC(=O)S—, —S—, —SC(=O)—, —SC(=O)O—, —SC(=O)NH—, or SC(=O)S—, $Z^{21}$ and $Z^{22}$ each independently represent an aromatic group as a 5-membered or 6-membered ring or a non-aromatic group as a 5-membered or 6-membered ring, $L^{21}$ represents a divalent linking group or a single bond linking $X^{212}$ and $P^{21}$ to each other, $P^{21}$ represents a substituent selected from the group consisting of a (meth)acryl group, an oxiranyl group, an oxetanyl group, a hydroxyl group, an amino group, a thiol group, an isocyanate group, a carboxyl group, and a carboxylic acid anhydride group, $Y^{22}$ represents a hydrogen atom, a linear, branched, or cyclic alkyl group having 1 to 20 carbon atoms, or a group obtained in a case where one methylene group or two or more methylene groups in a linear, branched, or cyclic alkyl group having 1 to 20 carbon atoms are substituted with —O—, —S—, —NH—, —N(CH$_3$)—, —C(=O)—, —OC(=O), or —C(=O)O—, $n^{21}$ and $n^{22}$ each independently represent an integer of 0 to 3, and in a case where each of $n^{21}$ and $n^{22}$ is equal to or greater than 2, a plurality of groups represented by $Z^{21}$—$X^{212}$ and $Z^{22}$—$X^{222}$ may be the same as or different from each other.

It is preferable that all of $R^{17}$, $R^{18}$, and $R^{19}$ represent *—$X^{211}$—$(Z^{21}$—$Z^{212})_{n21}$-$L^{21}$-$P^{21}$. It is more preferable that all of $R^{17}$, $R^{18}$, and $R^{19}$ are the same as each other.

As $X^{211}$, $X^{212}$, $X^{221}$, and $X^{222}$, a single bond and —OC(=O)— are preferable.

$Z^{21}$ and $Z^{22}$ each independently represent an aromatic group as a 5-membered or 6-membered ring or a non-aromatic group as a 5-membered or 6-membered ring. Examples thereof include a 1,4-phenylene group, a 1,3-phenylene group, a heterocyclic group, and the like.

The aromatic group and the non-aromatic group described above may have a substituent. The substituent includes substituents shown in the substituent group Y, which will be described later, an alkyl group, and an alkenyl group. The number of substituents is preferably 1 or 2, and more preferably 1. The substitution position is not particularly limited. As the substituent, a halogen atom or a methyl group is preferable. As the halogen atom, a chlorine atom or a fluorine atom is preferable. It is also preferable that the aromatic group and the non-aromatic group are unsubstituted.

Examples of the heterocyclic ring include the following heterocyclic rings.

In the formulae, * represents a portion bonded to $X^{211}$, ** represents a portion bonded to $X^{212}$; $A^{41}$ and $A^{42}$ each independently represent methine or a nitrogen atom; and $X^4$ represents an oxygen atom, a sulfur atom, methylene, or imino.

It is preferable that at least one of $A^{41}$ and $A^{42}$ represents a nitrogen atom. It is more preferable that both of $A^{41}$ and $A^{42}$ represent a nitrogen atom. Furthermore, it is preferable that $X^4$ represents an oxygen atom.

$L^{21}$ each independently represents a divalent linking group or a single bond linking $X^{212}$ and $P^{21}$ to each other, and has the same definition as $L^{11}$ in General Formula (XI). As $L^{21}$, —O—, —C(=O)O—, an alkylene group having 1 to 10 carbon atoms (preferably 1 to 8 carbon atoms and more preferably 1 to 6 carbon atoms), or a group obtained by combining these is preferable.

$P^{21}$ each independently represents a functional group, and has the same definition as $P^{11}$ in General Formula (XI). The preferred range of $P^{21}$ is the same as the preferred range of $P^{11}$ in General Formula (XI).

$Y^{22}$ each independently represents a hydrogen atom, a linear, branched, or cyclic alkyl group having 1 to 20 carbon atoms, or a group obtained in a case where one methylene group or two or more methylene groups in a linear, branched, or cyclic alkyl group having 1 to 20 carbon atoms are substituted with —O—, —S—, —NH—, —N(CH$_3$)—, —C(=O)—, —OC(=O)—, or —C(=O)O—. $Y^{22}$ has the same definition as $Y^{12}$ in General Formula (XI), and the preferred range thereof is also the same as the preferred range of $Y^{12}$ in General Formula (XI).

$n^{21}$ and $n^{22}$ each independently represent an integer of 0 to 3. $n^{21}$ and $n^{22}$ each independently preferably represent an integer of 1 to 3, and more preferably represent 2 or 3.

Regarding the details and specific examples of the compound represented by General Formula (XII), the description in paragraphs "0013" to "0077" in JP2010-244038A can be referred to, and the contents thereof are incorporated into the present specification.

It is preferable that the compound represented by General Formula (XI) or (XII) is a compound having a hydrogen bonding functional group, because then the stacking is enhanced by reducing the electron density, and hence a columnar aggregate is easily formed. Examples of the hydrogen bonding functional group include —OC(=O)NH—, —C(=O)NH—, —NHC(=O)—, —NHC(=O)O—, —NHC(=O)NH—, —NHC(=O)S—, SC(=O)NH—, and the like.

Specific examples of compounds particularly preferred as the compound represented by General Formula (XI) and the compound represented by General Formula (XII) include the following compounds.

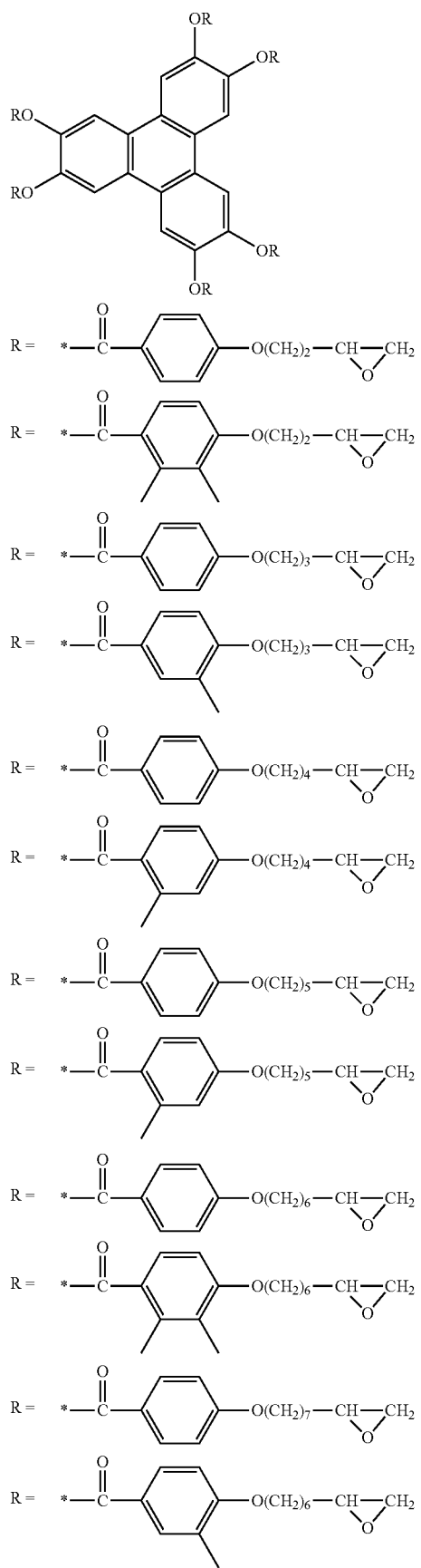
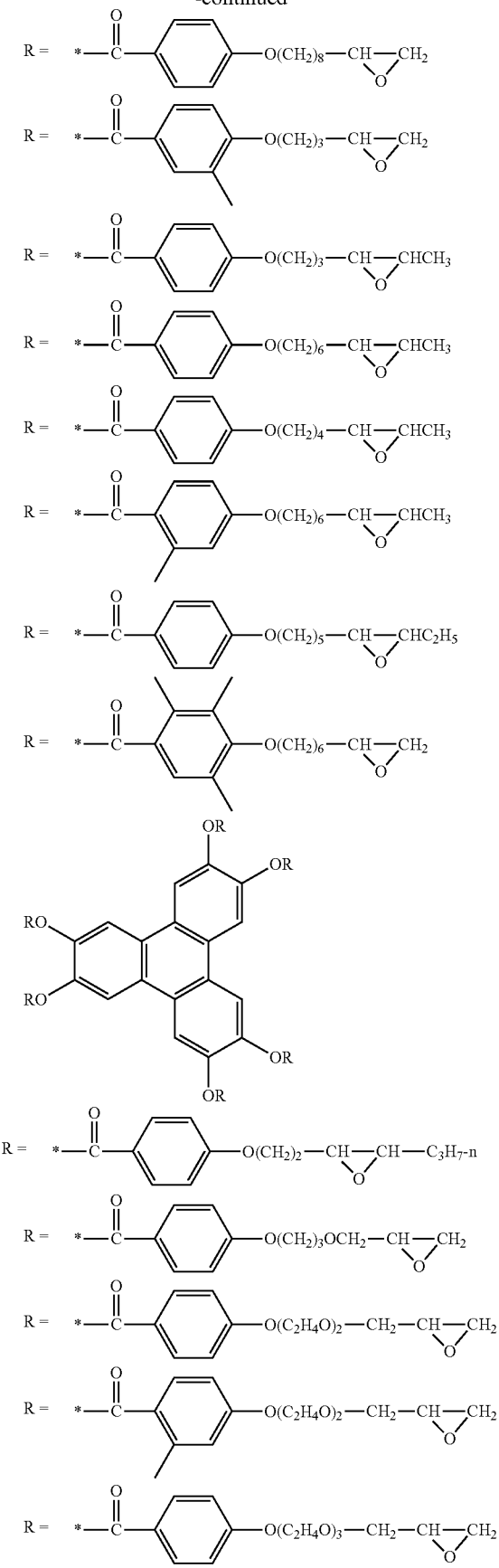

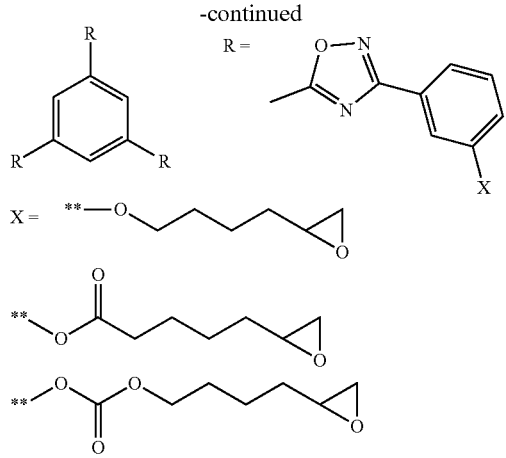
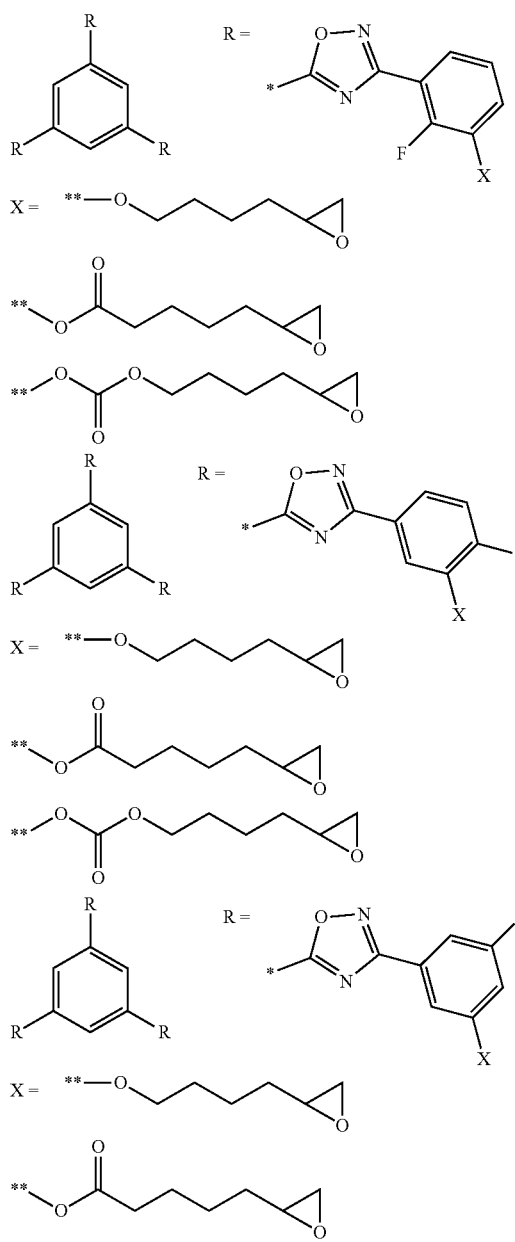
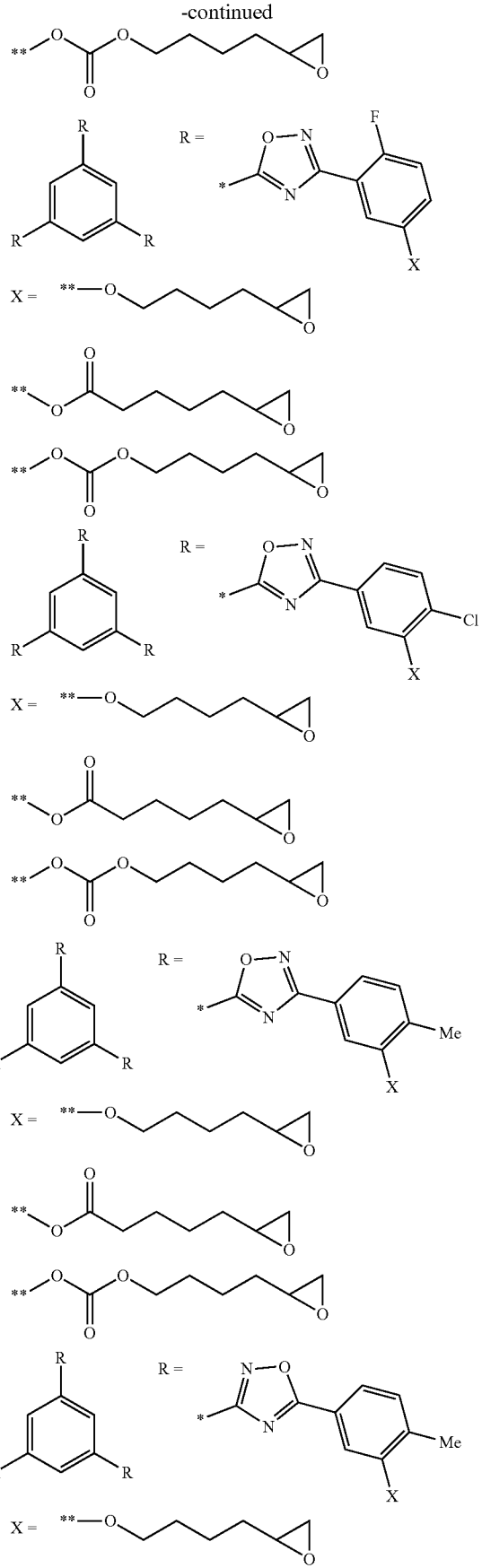
** represents a binding position. The same is true for the following description.

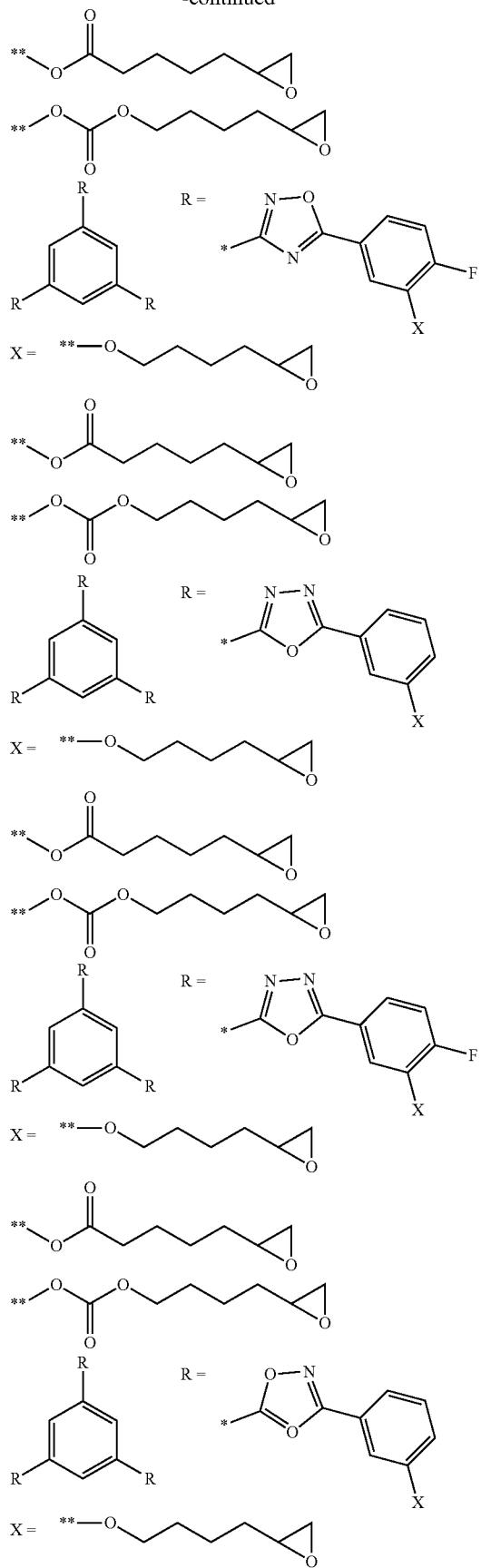
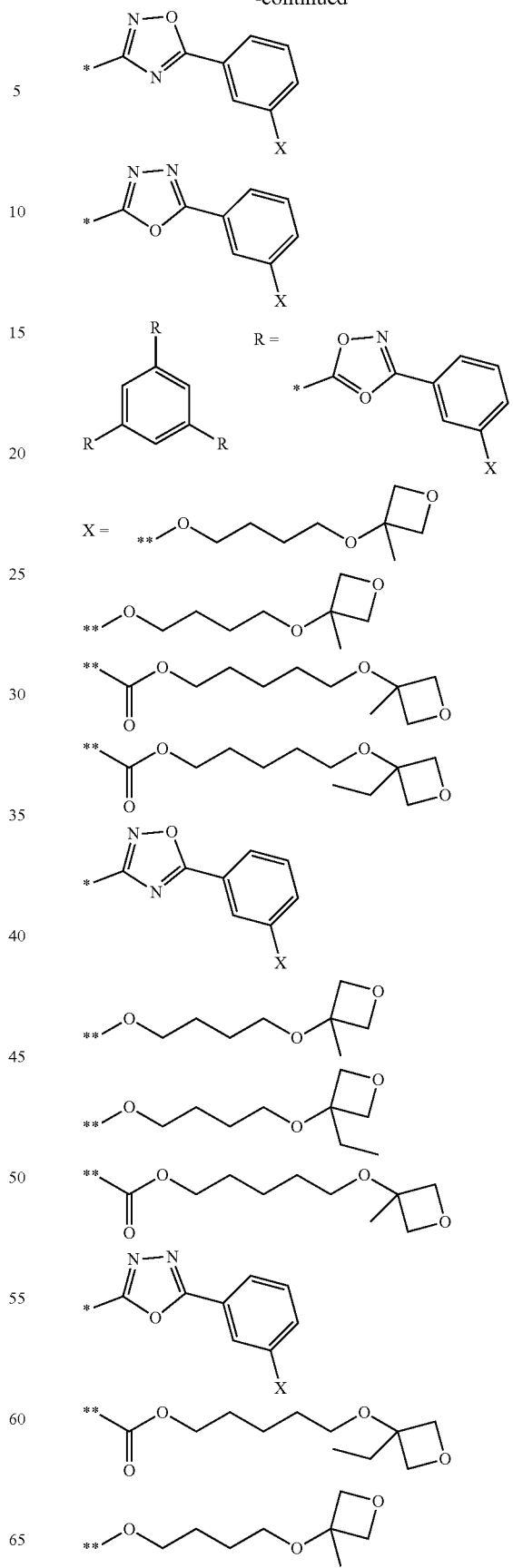

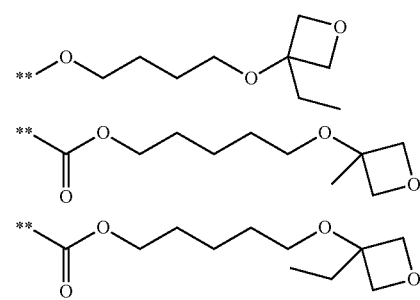
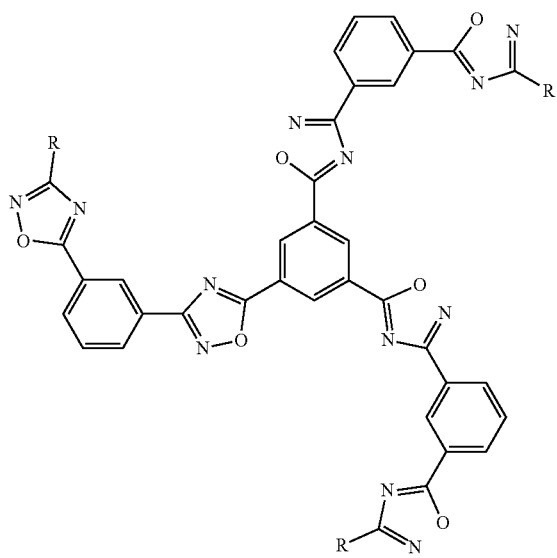
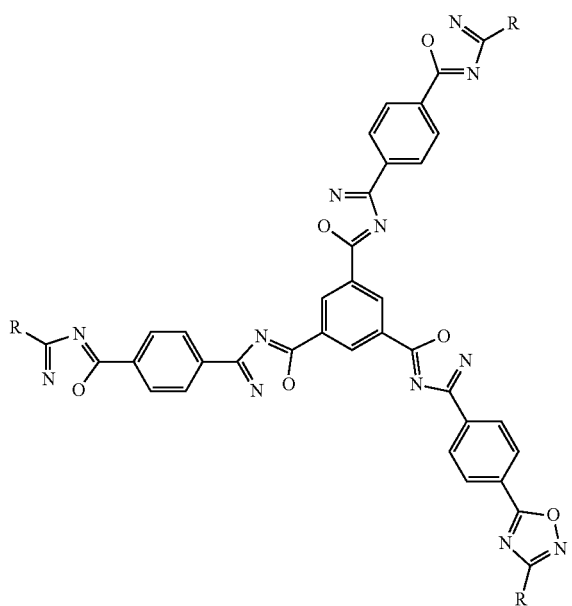
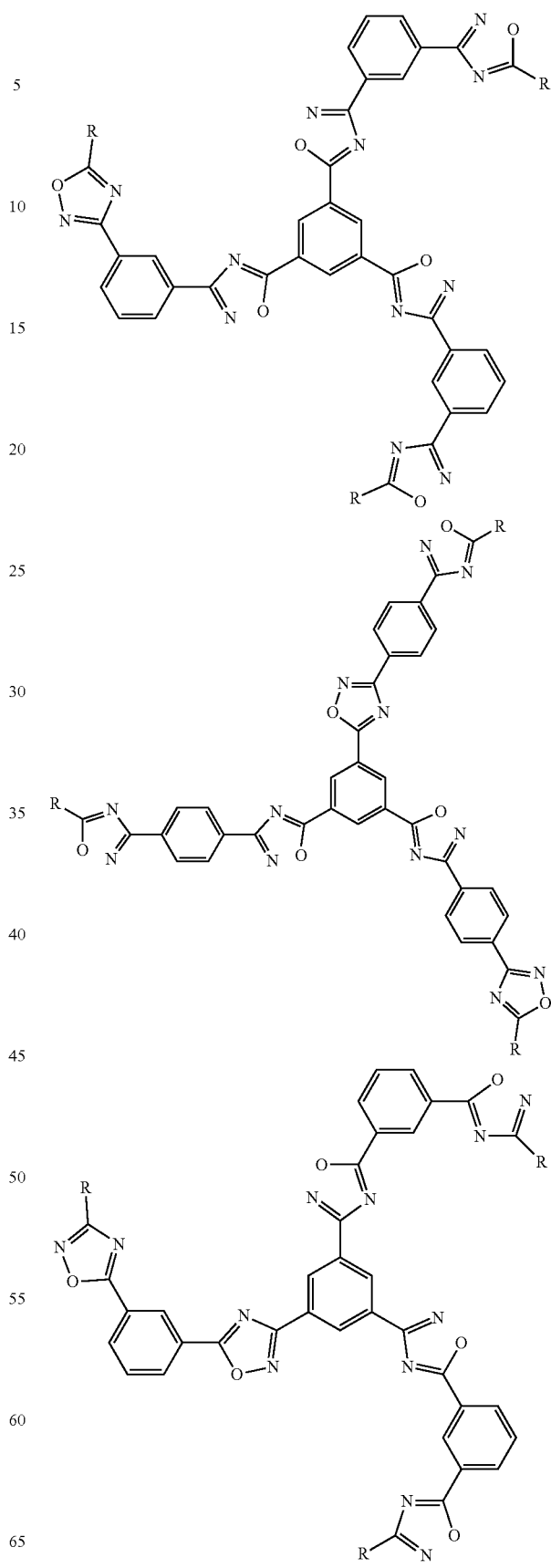

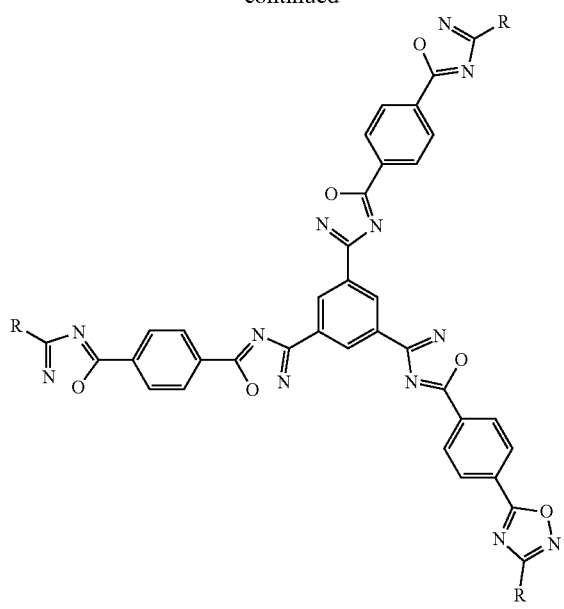

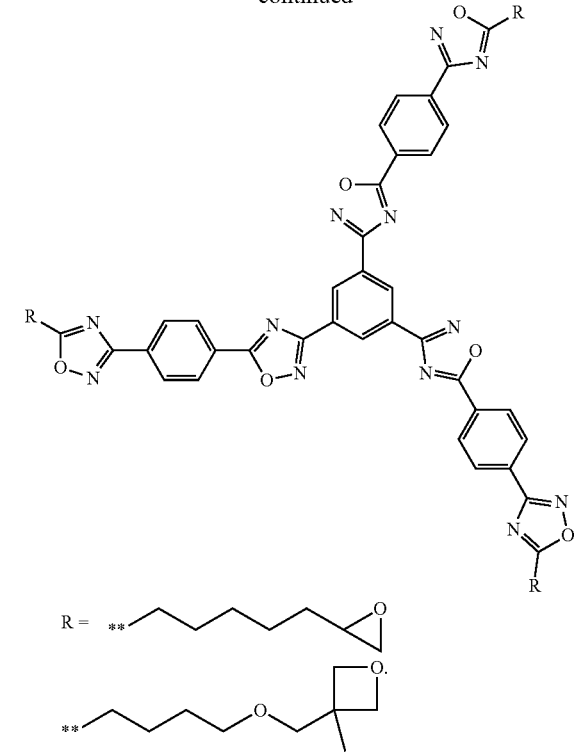

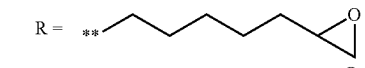
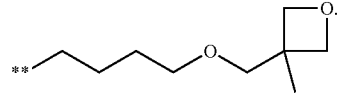

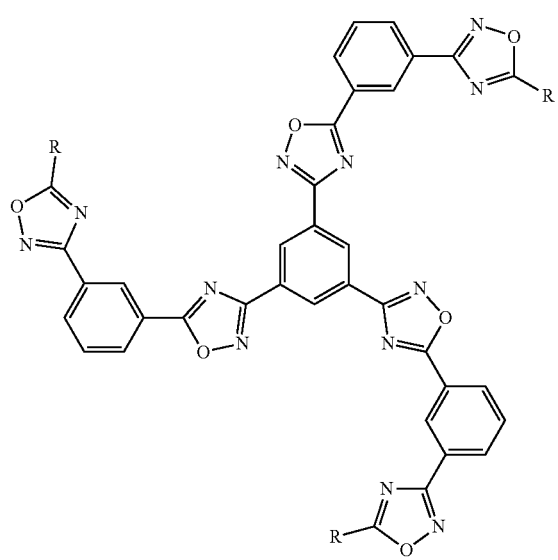

The compound represented by General Formula (XI) can be synthesized based on the methods described in JP1995-306317A (JP-H07-306317A), JP1995-281028A (JP-H07-281028A), JP2005-156822A, and JP2006-301614A.

The compound represented by General Formula (XII) can be synthesized based on the methods described in JP2010-244038A, JP2006-76992A, and JP2007-2220A.

<Curing Agent>

The resin composition may contain a curing agent.

The curing agent is not particularly limited as long as it is a compound having a functional group selected from the group consisting of a hydroxyl group, an amino group, a thiol group, an isocyanate group, a carboxyl group, and a carboxylic acid anhydride group. It is preferable that the curing agent has a functional group selected from the group consisting of a hydroxyl group, an amino group, and a thiol group. The curing agent preferably has two or more functional groups described above and more preferably has two functional groups described above.

Examples of the curing agent include the curing agent for an epoxy resin described in "0028" in JP4118691B, the amine-based curing agent, the phenol-based curing agent, or the acid anhydride-based curing agent described in "0016" to "0018" in JP2008-13759A, the amine-based curing agent and the phenol-based curing agent described in "0101" to "0150" in JP2013-227451A, and the like.

Among these, the amine-based curing agent is particularly preferable, and examples of compounds preferred as the amine-based curing agent include 4,4'-diaminodiphenylmethane, 4,4'-diaminodiphenylether, 4,4'-diaminodiphenylsulfone, 4,4'-diamino-3,3'-dimethoxybiphenyl, 4,4'-diaminophenylbenzoate, 1,5-diaminonaphthalene, 1,3-diaminonaphthalene, 1,4-diaminonaphthalene, 1,8-diaminonaphthalene, and the like.

The content of the curing agent in the resin composition with respect to the mass of total solid content in the resin composition (the mass of the total solid content except for a solvent) is preferably 90% by mass to 10% by mass, and more preferably 80% by mass to 30% by mass.

[Curing Accelerator]

The resin composition may contain a curing accelerator. Examples of the curing accelerator include triphenylphosphine, 2-ethyl-4-methylimidazole, a boron trifluoride amine complex, 1-benzyl-2-methylimidazole, and those described in paragraph "0052" in JP2012-67225A.

The content of the curing accelerator in the resin composition with respect to the mass of total solid content in the resin composition (the mass of the total solid content except for a solvent) is preferably 20% by mass to 0.1% by mass, and more preferably 10% by mass to 1% by mass.

<Solvent>

The resin composition may be prepared as a solution.

The solvent of the aforementioned solution is not particularly limited, but is preferably an organic solvent. Examples of the organic solvent include ethyl acetate, methyl ethyl ketone (MEK), dichloromethane, tetrahydrofuran (THF), and the like.

<Use of Resin Composition>

In the resin composition of the present invention, the surface of an inorganic substance is modified using a boronic acid compound, and accordingly, the dispersibility of the inorganic substance in an organic solvent, a water solvent, a resin, or the like is improved. By exploiting such characteristics, the resin composition can be applied to various fields as a pigment, a catalyst, an electrode material, a semiconductor material, a heat dissipation material, a thermally conductive material, a lubricant, and the like. It is particularly preferable that the resin composition of the present invention is used for forming a thermally conductive material.

[Thermally Conductive Material]

The thermally conductive material is a material having thermal conductivity. The thermally conductive material can be used as a heat dissipation material such as a heat dissipation sheet, and can be used for dissipating heat from various devices such as power semiconductor devices.

The shape of the thermally conductive material is not particularly limited, and can be molded to have various shapes according to the use. Typically, the thermally conductive material is preferably in the form of a film or sheet.

The thermally conductive material of the present invention includes a cured substance of a resin composition containing a surface-modified inorganic substance and an epoxy compound. The cured substance can be prepared by a curing reaction of the resin composition. The curing may be a thermal curing reaction or a photocuring reaction, and the curing reaction may be selected according to the functional group of the monomer in the resin composition. Generally, a thermal curing reaction is preferable as curing. The heating temperature at the time of the curing is not particularly limited. For example, the heating temperature may be appropriately selected within a range of 50° C. to 200° C. and preferably within a range of 60° C. to 150° C.

It is preferable that the curing is performed on the resin composition formed into a film or sheet. Specifically, the resin composition may be formed into a film by coating and subjected to a curing reaction. At this time, press working may also be performed.

The curing may be semi-curing. Furthermore, the thermally conductive material may be disposed in a device to be used or the like by being brought into contact with the device, and then permanently cured by being further cured through heating or the like. It is also preferable to allow the device and the thermally conductive material of the present invention to stick to each other through the heating or the like that is performed for the permanent curing described above.

Regarding the preparation of the thermally conductive material including the curing reaction, "Highly Thermally Conductive Composite Material" (CMC Publishing CO., LTD., Yoshitaka Takezawa) can be referred to.

EXAMPLES

Hereinafter, the present invention will be more specifically described based on examples. The materials and reagents, the amounts of substances and a ratio therebetween, the operation, and the like described in the following examples can be appropriately changed within a range that does not depart from the gist of the present invention. Accordingly, the scope of the present invention is not limited to the following examples.

<Formation of Self-Supported Film by Using Resin Composition>

By mixing the materials in Table 1 together, a slurry was prepared. A 2.0 cm×2.5 cm PET film (COSMOSHINE, manufactured by Toyobo Co., Ltd., film thickness: 50 μm) was coated with 1 mL of the slurry by using a spin coater, thereby preparing a film having a uniform surface shape. The film was disposed on a hot plate, and the solvent was stepwise evaporated for 30 seconds at 60° C., 30 seconds at 80° C., and 30 seconds at 100° C. Thereafter, the film was heated for 30 seconds at 160° C., then cooled to room temperature, and peeled from the PET film, thereby a self-supported film having a thickness of about 400 μm.

The materials in Table 1 were prepared as below.

[Main Agent]

(Disk-Like Liquid Crystal Compound 2)

According to the method described in examples in JP2696480B, a compound TP-85 was synthesized and used as a disk-like liquid crystal compound 2.

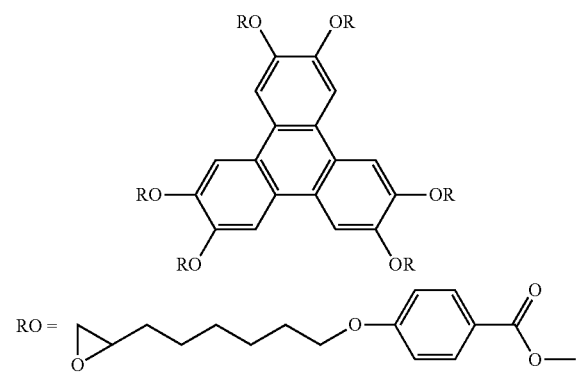

(Disk-Like Liquid Crystal Compound 4)

According to the method described in examples in JP5385937B, a trihydroxy substance shown below was synthesized. The substance was alkylated based on the method described in examples in JP2696480B and then oxidized using mCPBA, thereby obtaining a disk-like liquid crystal compound 4 shown below.

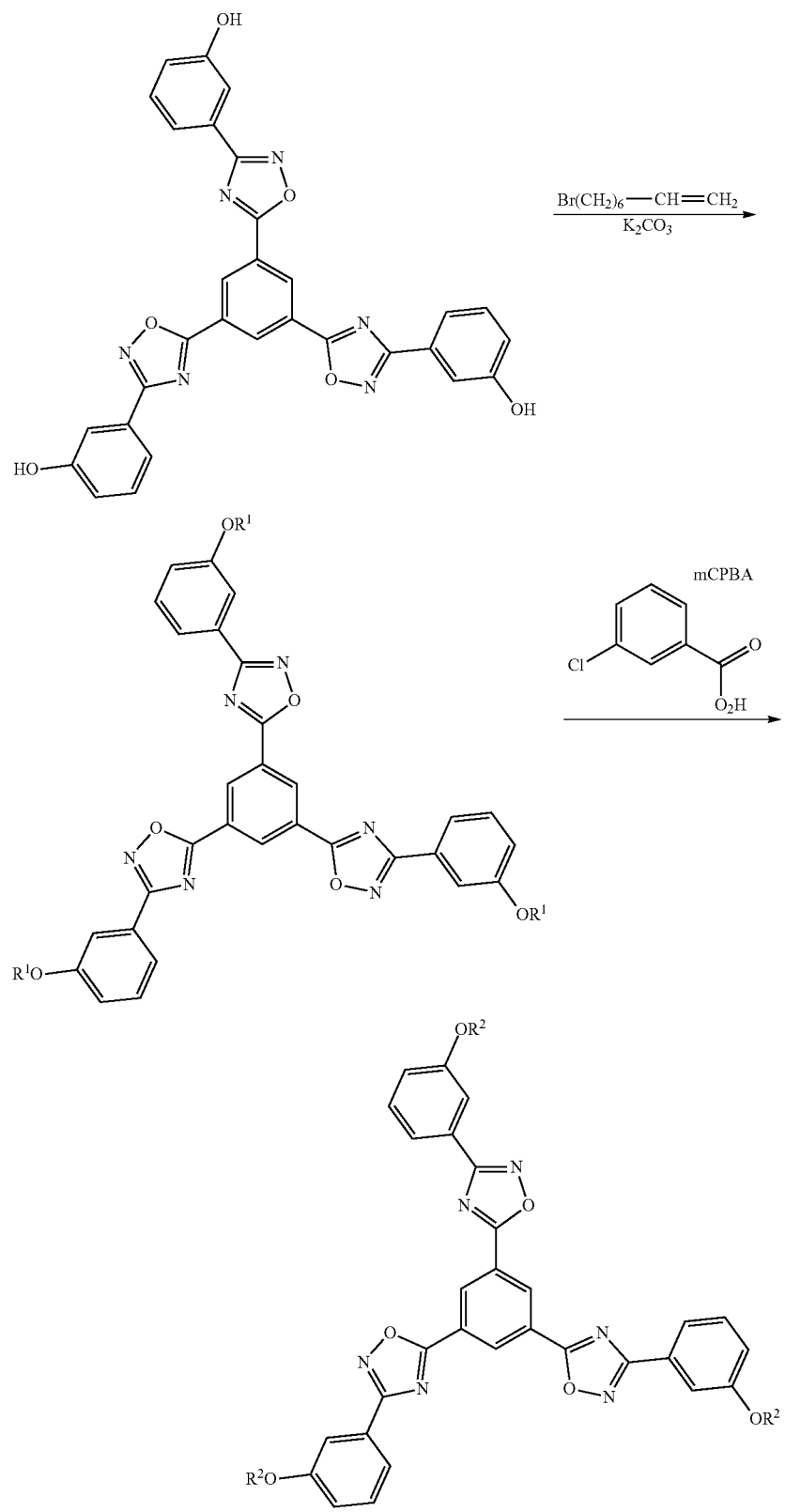

(Disk-Like Liquid Crystal Compound 6)

According to the method described in Example 13 in JP5620129B, an intermediate shown below was synthesized. Then, the intermediate was reacted with epichlorohydrin, thereby synthesizing a disk-like liquid crystal compound 6.

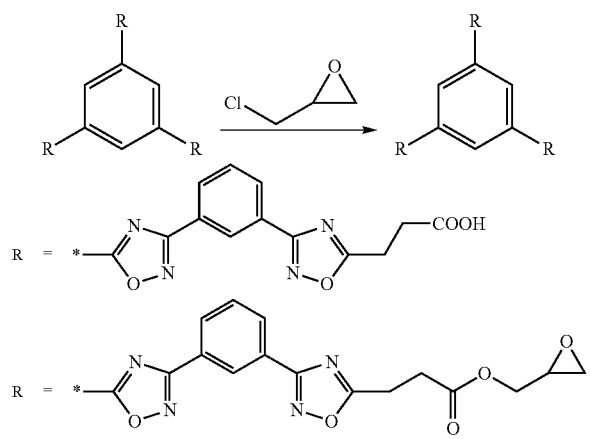

(Rod-Like Compound)

Rod-like compound 1: jER YL6121H (manufactured by Mitsubishi Chemical Corporation)

Rod-like compound 2: jER 828US (manufactured by Mitsubishi Chemical Corporation)

[Curing Agent]

Curing agent 1: 1,5-naphthalenediamine (manufactured by TOKYO CHEMICAL INDUSTRY CO., LTD.)

Curing agent 2: 4,4'-diaminodiphenylmethane (manufactured by TOKYO CHEMICAL INDUSTRY CO., LTD.)

Curing agent 3: 4,4'-diaminodiphenylsulfone (manufactured by TOKYO CHEMICAL INDUSTRY CO., LTD.)

[Inorganic Substance]

Boron nitride 1 (hereinafter, described as BN1): BORONID Cooling Filer AGGLOMERATE 50 (manufactured by 3M)

Boron nitride 2 (hereinafter, described as BN2): BORONID Cooling Filer AGGLOMERATE 100 (manufactured by 3M)

Boron nitride 3 (hereinafter, described as BN3): DENKA BORON NITRIDE FP70 (manufactured by Denka Company Limited.)

Alumina: AW70 (manufactured by Micron Co., Ltd.)

[Surface Modifier]

Boronic acid 1: p-hydroxyphenyl boronic acid (manufactured by Wako Pure Chemical Industries, Ltd.)

Boronic acid 2: m-aminophenyl boronic acid (manufactured by Wako Pure Chemical Industries, Ltd.)

[Measurement of Thermal Conductivity]

(1) By using "ai-Phase Mobile 1u" manufactured by ai-Phase Co., Ltd., a coefficient of thermal diffusivity in a thickness direction was measured.

(2) By using a balance "XS204" ("solid specific gravity measuring kit" is used) manufactured by METTLER TOLEDO, the specific gravity was measured.

(3) By using "DSC320/6200" manufactured by Seiko Instruments Inc. and software of DSC7, the specific heat at 25° C. was determined under the heating condition of 10° C./min.

(4) The obtained coefficient of thermal diffusivity was multiplied by the specific gravity and the specific heat, thereby calculating the thermal conductivity. The results are shown in Table 1.

TABLE 1

| | Main agent | g | Curing agent | g | Inorganic substance | g | Surface modifier | g | Solvent | g | Thermal conductivity (W/m · K) |
|---|---|---|---|---|---|---|---|---|---|---|---|
| Example 1 | Disk-like liquid crystal compound 2 | 3 | Curing agent 1 | 2.5 | BN1 | 5 | Boronic acid 1 | 0.05 | MEK | 5 | 13.4 |
| Example 2 | Disk-like liquid crystal compound 2 | 3 | Curing agent 2 | 2.5 | BN1 | 5 | Boronic acid 1 | 0.05 | MEK | 5 | 13.2 |
| Example 3 | Disk-like liquid crystal compound 2 | 3 | Curing agent 3 | 2.5 | BN1 | 5 | Boronic acid 1 | 0.05 | MEK | 5 | 13.6 |
| Example 4 | Disk-like liquid crystal compound 2 | 3 | Curing agent 1 | 2.5 | BN1 (80) + alumina (20) | 5 | Boronic acid 1 | 0.05 | MEK | 5 | 12.9 |
| Example 5 | Disk-like liquid crystal compound 2 | 3 | Curing agent 1 | 2.5 | BN2 | 5 | Boronic acid 1 | 0.05 | MEK | 5 | 12.6 |
| Example 6 | Disk-like liquid crystal compound 2 | 3 | Curing agent 1 | 2.5 | BN3 | 5 | Boronic acid 1 | 0.05 | MEK | 5 | 13.1 |
| Example 7 | Disk-like liquid crystal compound 2 | 3 | Curing agent 1 | 2.5 | BN1 | 5 | Boronic acid 2 | 0.05 | MEK | 5 | 14.4 |
| Example 8 | Disk-like liquid crystal compound 4 | 3 | Curing agent 1 | 2.5 | BN1 | 5 | Boronic acid 1 | 0.05 | MEK | 5 | 12.2 |
| Example 9 | Disk-like liquid crystal compound 4 | 3 | Curing agent 1 | 2.5 | BN1 | 5 | Boronic acid 2 | 0.05 | MEK | 5 | 12.1 |
| Example 10 | Disk-like liquid crystal compound 6 | 3 | Curing agent 1 | 2.5 | BN1 | 5 | Boronic acid 1 | 0.05 | MEK | 5 | 12.4 |
| Example 11 | Disk-like liquid crystal compound 6 | 3 | Curing agent 1 | 2.5 | BN1 | 5 | Boronic acid 2 | 0.05 | MEK | 5 | 13.2 |
| Example 12 | Rod-like compound 1 | 3 | Curing agent 1 | 2.5 | BN1 | 5 | Boronic acid 1 | 0.05 | MEK | 5 | 9.5 |
| Example 13 | Rod-like compound 2 | 3 | Curing agent 1 | 2.5 | BN1 | 5 | Boronic acid 1 | 0.05 | MEK | 5 | 9.1 |
| Comparative Example 1 | Disk-like liquid crystal compound 2 | 3 | Curing agent 1 | 2.5 | BN1 | 5 | N/A | 0.00 | MEK | 5 | 11.2 |
| Comparative Example 2 | Disk-like liquid crystal compound 2 | 3 | Curing agent 2 | 2.5 | BN1 | 5 | N/A | 0.00 | MEK | 5 | 10.9 |

TABLE 1-continued

| | Main agent | g | Curing agent | g | Inorganic substance | g | Surface modifier | g | Solvent | g | Thermal conductivity (W/m · K) |
|---|---|---|---|---|---|---|---|---|---|---|---|
| Comparative Example 3 | Disk-like liquid crystal compound 2 | 3 | Curing agent 3 | 2.5 | BN1 | 5 | N/A | 0.00 | MEK | 5 | 10.5 |
| Comparative Example 4 | Disk-like liquid crystal compound 2 | 3 | Curing agent 1 | 2.5 | BN1 (80) + alumina (20) | 5 | N/A | 0.00 | MEK | 5 | 10.3 |
| Comparative Example 5 | Disk-like liquid crystal compound 2 | 3 | Curing agent 1 | 2.5 | BN2 | 5 | N/A | 0.00 | MEK | 5 | 9.8 |
| Comparative Example 6 | Disk-like liquid crystal compound 2 | 3 | Curing agent 1 | 2.5 | BN3 | 5 | N/A | 0.00 | MEK | 5 | 9.6 |
| Comparative Example 7 | Disk-like liquid crystal compound 4 | 3 | Curing agent 1 | 2.5 | BN1 | 5 | N/A | 0.00 | MEK | 5 | 10.1 |
| Comparative Example 8 | Disk-like liquid crystal compound 6 | 3 | Curing agent 1 | 2.5 | BN1 | 5 | N/A | 0.00 | MEK | 5 | 10.5 |
| Comparative Example 9 | Rod-like compound 1 | 3 | Curing agent 1 | 2.5 | BN1 | 5 | N/A | 0.00 | MEK | 5 | 8.1 |
| Comparative Example 10 | Rod-like compound 2 | 3 | Curing agent 1 | 2.5 | BN1 | 5 | N/A | 0.00 | MEK | 5 | 7.3 |

From the results shown in the table, it is understood that in all of the examples in which the boronic acid compound is used as a surface modifier, the obtained thermal conductivity is higher than that in the comparative examples in which the boronic acid compound is not used.

What is claimed is:

1. A resin composition comprising;
a surface-modified inorganic substance which is obtained by performing surface modification on an inorganic nitride by using a boronic acid compound; and
an epoxy compound.

2. The resin composition according to claim 1, wherein the surface modification is modification based on the formation of a covalent bond that the boronic acid compound forms with a surface of the inorganic substance.

3. A resin composition comprising:
one or more inorganic substances selected from the group consisting of an inorganic nitride and an inorganic oxide;
a boronic acid compound; and
an epoxy compound,
wherein the inorganic oxide is titanium oxide, aluminum oxide, or zinc oxide, and
the boronic acid compound is represented by General Formula I or General Formula II,

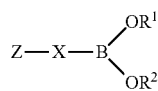

General Formula I in the formula, Z represents an amino group, a thiol group, a hydroxyl group, an isocyanate group, a carboxyl group, a carboxylic acid anhydride group, a polymerizable group, a hydrogen atom, a halogen atom, a quaternary ammonium group or a salt thereof, or a quaternary pyridinium group, which may have a substituent, or a salt thereof, X represents a linking group A, a linking group constituted with a combination of two or more linking groups A, or a linking group constituted with a combination of one or more linking groups A and one or more linking groups B, linking group A is selected from the group consisting of a divalent aliphatic hydrocarbon group which may have a substituent, an arylene group which may have a substituent, and a heteroarylene group which may have a substituent, linking groups B is selected from the group consisting of —O—, —CO—, —NH—, —CO—NH—, —COO—, and —O—COO—, $R^1$ and $R^2$ each independently represent a hydrogen atom, an aliphatic hydrocarbon group which may have a substituent, an aryl group which may have a substituent, or a heteroaryl group which may have a substituent, and $R^1$ and $R^2$ may be linked to each other through an alkylene linking group, an arylene linking group, or a linking group formed of a combination of these;

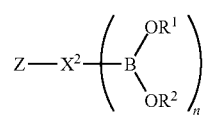

General Formula II in the formula, Z represents an amino group, a thiol group, a hydroxyl group, an isocyanate group, a carboxyl group, a carboxylic acid anhydride group, a polymerizable group, a hydrogen atom, a halogen atom, a quaternary ammonium group or a salt thereof, or a quaternary pyridinium group which may have a substituent or a salt thereof, $X^2$ represents an (n+1)-valent linking group obtained by further removing certain (n−1) hydrogen atoms from a divalent linking group represented by the X of the General Formula I, $R^1$ and $R^2$ each independently represent a hydrogen atom, an aliphatic hydrocarbon group which may have a substituent, an aryl group which may have a substituent, or a heteroaryl group which may have a substituent, $R^1$ and $R^2$ may be linked to each other through an alkylene linking group, an arylene linking group, or a linking group formed of a combination of these, and n represents an integer of equal to or greater than 2.

4. The resin composition according to claim 1, wherein the inorganic nitride includes boron, aluminum, or silicon.

5. The resin composition according to claim 1, wherein the inorganic nitride is boron nitride.

6. The resin composition according to claim 1, wherein the inorganic nitride is aluminum nitride.

7. A resin composition comprising;
a surface-modified inorganic substance which is obtained by performing surface modification on an inorganic oxide by using a boronic acid compound; and
an epoxy compound,
wherein the boronic acid compound has an oxiranyl group.

8. The resin composition according to claim 7, wherein the inorganic oxide is titanium oxide, aluminum oxide, or zinc oxide.

9. The resin composition according to claim 1, wherein the boronic acid compound is represented by General Formula I,

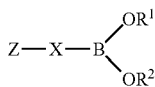

General Formula I in the formula, Z represents an amino group, a thiol group, a hydroxyl group, an isocyanate group, a carboxyl group, a carboxylic acid anhydride group, a polymerizable group, a hydrogen atom, a halogen atom, a quaternary ammonium group or a salt thereof, or a quaternary pyridinium group, which may have a substituent, or a salt thereof, X represents a divalent linking group including at least one linking group A selected from the group consisting of a divalent aliphatic hydrocarbon group which may have a substituent, an arylene group which may have a substituent, and a heteroarylene group which may have a substituent, $R^1$ and $R^2$ each independently represent a hydrogen atom, an aliphatic hydrocarbon group which may have a substituent, an aryl group which may have a substituent, or a heteroaryl group which may have a substituent, and $R^1$ and $R^2$ may be linked to each other through an alkylene linking group, an arylene linking group, or a linking group formed of a combination of these.

10. The resin composition according to claim 1, wherein the boronic acid compound is represented by General Formula II;

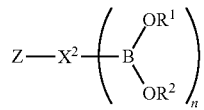

General Formula II in the formula, Z represents an amino group, a thiol group, a hydroxyl group, an isocyanate group, a carboxyl group, a carboxylic acid anhydride group, a polymerizable group, a hydrogen atom, a halogen atom, a quaternary ammonium group or a salt thereof, or a quaternary pyridinium group which may have a substituent or a salt thereof, $X^2$ represents an (n+1)-valent linking group including at least one linking group A selected from the group consisting of a divalent aliphatic hydrocarbon group which may have a substituent, an arylene group which may have a substituent, and a heteroarylene group which may have a substituent, $R^1$ and $R^2$ each independently represent a hydrogen atom, an aliphatic hydrocarbon group which may have a substituent, an aryl group which may have a substituent, or a heteroaryl group which may have a substituent, $R^1$ and $R^2$ may be linked to each other through an alkylene linking group, an arylene linking group, or a linking group formed of a combination of these, and n represents an integer of equal to or greater than 2.

11. The resin composition according to claim 1, wherein the boronic acid compound has an amino group, a thiol group, a hydroxyl group, an isocyanate group, a carboxyl group, or a carboxylic acid anhydride group.

12. The resin composition according to claim 1, further comprising:
a curing agent having a group selected from the group consisting of an amino group, a thiol group, a hydroxyl group, an isocyanate group, a carboxyl group, and a carboxylic acid anhydride group.

13. A thermally conductive material comprising:
a cured substance of the resin composition according to claim 1.

14. The thermally conductive material according to claim 13 that is in the form of a sheet.

15. The thermally conductive material according to claim 14 that is a heat dissipation sheet.

16. A device comprising:
the thermally conductive material according to claim 13.

17. A thermally conductive material comprising:
a cured substance of the resin composition according to claim 3.

18. A device comprising:
the thermally conductive material according to claim 17.

19. A thermally conductive material comprising:
a cured substance of the resin composition according to claim 7.

20. The thermally conductive material according to claim 19 that is in the form of a sheet.

21. The thermally conductive material according to claim 20 that is a heat dissipation sheet.

22. A device comprising:
the thermally conductive material according to claim 19.

* * * * *